US012803116B2

(12) United States Patent
Choi et al.

(10) Patent No.: US 12,803,116 B2
(45) Date of Patent: Nov. 17, 2026

(54) SECONDARY BATTERY AND MANUFACTURING METHOD THEREOF

(71) Applicant: LG Energy Solution, Ltd., Seoul (KR)

(72) Inventors: Seong Won Choi, Daejeon (KR); Kyoung Won Kang, Daejeon (KR); Su Taek Jung, Daejeon (KR); Yong Jun Lee, Daejeon (KR); Soon Kwan Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 104 days.

(21) Appl. No.: 18/371,884

(22) Filed: Sep. 22, 2023

(65) Prior Publication Data

US 2024/0014512 A1 Jan. 11, 2024

Related U.S. Application Data

(62) Division of application No. 17/478,125, filed on Sep. 17, 2021, now Pat. No. 11,799,173.

(30) Foreign Application Priority Data

Nov. 18, 2020 (KR) ........................ 10-2020-0155000
Sep. 16, 2021 (KR) ........................ 10-2021-0124053

(51) Int. Cl.
*H01M 50/466* (2021.01)
*H01M 10/04* (2006.01)
(Continued)

(52) U.S. Cl.
CPC ..... *H01M 50/461* (2021.01); *H01M 10/0459* (2013.01); *H01M 10/049* (2013.01); *H01M 50/466* (2021.01); *H01M 50/536* (2021.01)

(58) Field of Classification Search
CPC ...... H01M 50/40; H01M 50/20; H01M 50/46; H01M 50/461; H01M 10/04; H01M 10/049; H01M 10/0525
See application file for complete search history.

(56) References Cited

U.S. PATENT DOCUMENTS 4,049,882 A * 9/1977 Beatty ................. H01M 50/538 429/94
4,080,727 A * 3/1978 Stolle ...................... B32B 38/18 156/484

(Continued)

FOREIGN PATENT DOCUMENTS

CN 107925114 A 4/2018
CN 108701855 A 10/2018

(Continued)

OTHER PUBLICATIONS

Extended European Search Report including Search Opinion from EP Appl. No. 22811500.2, dated Aug. 13, 2024, pp. 1-10.

(Continued)

*Primary Examiner* — Kenneth J Douyette
(74) *Attorney, Agent, or Firm* — Lerner David LLP

(57) ABSTRACT

A method for manufacturing a secondary battery includes: assembling an electrode assembly having a plurality of electrodes separated by at least one separator positioned between each of the electrodes; sealing the electrode assembly and an electrolyte solution in a battery case; and dissolving at least a portion of an adhesive into the electrolyte solution such that a mark from the adhesive is left on the separator. The step of assembling the electrode assembly includes adhering a first one of the plurality of electrodes to the at least one separator with the adhesive positioned between the first electrode and the separator. A secondary battery manufactured by such method is also provided.

18 Claims, 14 Drawing Sheets

(51) Int. Cl.
*H01M 50/46* (2021.01)
*H01M 50/536* (2021.01)

(56) References Cited

U.S. PATENT DOCUMENTS

| | | | | |
|---|---|---|---|---|
| 5,981,107 | A | 11/1999 | Hamano et al. | |
| 6,051,342 | A | 4/2000 | Hamano et al. | |
| 6,503,657 | B1 | 1/2003 | Takami et al. | |
| 8,617,257 | B2 | 12/2013 | Kadowaki et al. | |
| 9,356,312 | B2 | 5/2016 | Lee et al. | |
| 10,476,096 | B2 | 11/2019 | Kim et al. | |
| 2002/0182490 | A1 | 12/2002 | Cho et al. | |
| 2006/0073380 | A1 | 4/2006 | Kim et al. | |
| 2010/0310930 | A1 | 12/2010 | Park et al. | |
| 2011/0129722 | A1 | 6/2011 | Yoneda | |
| 2011/0177383 | A1* | 7/2011 | Culver | H01M 50/40 429/211 |
| 2013/0224552 | A1 | 8/2013 | Hong et al. | |
| 2013/0316205 | A1 | 11/2013 | Kim et al. | |
| 2014/0037857 | A1* | 2/2014 | Cheverton | C04B 41/5031 427/586 |
| 2014/0154565 | A1 | 6/2014 | Ku et al. | |
| 2014/0329141 | A1 | 11/2014 | Onizuka et al. | |
| 2015/0093629 | A1 | 4/2015 | Sayre et al. | |
| 2015/0180082 | A1 | 6/2015 | Jung et al. | |
| 2015/0325884 | A1 | 11/2015 | Fukunaga et al. | |
| 2016/0111699 | A1 | 4/2016 | Ahn et al. | |
| 2016/0268580 | A1* | 9/2016 | Yi | H01M 50/50 |
| 2017/0012266 | A1 | 1/2017 | Arora et al. | |
| 2017/0117509 | A1* | 4/2017 | Schumann | H01M 50/193 |
| 2017/0179453 | A1* | 6/2017 | Uejima | B32B 7/12 |
| 2017/0331091 | A1 | 11/2017 | Modeki | |
| 2017/0358783 | A1 | 12/2017 | Kim | |
| 2018/0034028 | A1 | 2/2018 | Jung et al. | |
| 2018/0323415 | A1 | 11/2018 | Lee et al. | |
| 2018/0351149 | A1 | 12/2018 | Akiike et al. | |
| 2019/0044177 | A1 | 2/2019 | Lee et al. | |
| 2019/0181412 | A1 | 6/2019 | Li et al. | |
| 2019/0221808 | A1 | 7/2019 | Honda et al. | |
| 2020/0028200 | A1 | 1/2020 | Sauerteig et al. | |
| 2020/0161617 | A1 | 5/2020 | Heo et al. | |
| 2020/0411896 | A1 | 12/2020 | Hong et al. | |
| 2021/0057719 | A1 | 2/2021 | Song et al. | |
| 2021/0320336 | A1 | 10/2021 | Ahn et al. | |
| 2021/0344048 | A1 | 11/2021 | Sato et al. | |
| 2022/0123297 | A1 | 4/2022 | Lee et al. | |

FOREIGN PATENT DOCUMENTS

| | | | |
|---|---|---|---|
| EP | 3940826 | A1 | 1/2022 |
| EP | 3951972 | A1 | 2/2022 |
| JP | H11121044 | A | 4/1999 |
| JP | 2002251991 | A | 9/2002 |
| JP | 2004071358 | A | 3/2004 |
| JP | 2009088279 | A | 4/2009 |
| JP | 2011165359 | A | 8/2011 |
| JP | 2014534599 | A | 12/2014 |
| JP | 5687443 | B2 | 3/2015 |
| JP | 2015532766 | A | 11/2015 |
| JP | 2016103376 | A | 6/2016 |
| JP | 2017050215 | A | 3/2017 |
| JP | 201784732 | A | 5/2017 |
| JP | 2018506820 | A | 3/2018 |
| JP | 2018113122 | A | 7/2018 |
| JP | 2018520491 | A | 7/2018 |
| JP | 2018152226 | A | 9/2018 |
| JP | 2019053862 | A | 4/2019 |
| JP | 2019091581 | A | 6/2019 |
| JP | 2019192339 | A | 10/2019 |
| JP | 2019530176 | A | 10/2019 |
| JP | 2020173923 | A | 10/2020 |
| JP | WO2020-054801 | A1 | 8/2021 |
| KR | 19980064181 | A | 10/1998 |
| KR | 20010086415 | A | 9/2001 |
| KR | 100614390 | B1 | 8/2006 |
| KR | 20070108764 | A | 11/2007 |
| KR | 20080017114 | A | 2/2008 |
| KR | 20080021166 | A | 3/2008 |
| KR | 101084909 | B1 | 11/2011 |
| KR | 20110138719 | A | 12/2011 |
| KR | 101168650 | B1 | 7/2012 |
| KR | 101589811 | B1 | 1/2016 |
| KR | 20160038600 | A | 4/2016 |
| KR | 20160039380 | A | 4/2016 |
| KR | 20160109408 | A | 9/2016 |
| KR | 20160117109 | A | 10/2016 |
| KR | 20170022042 | A | 3/2017 |
| KR | 20170027677 | A | 3/2017 |
| KR | 20170094713 | A | 8/2017 |
| KR | 20170101582 | A | 9/2017 |
| KR | 2017-0111234 | A | 10/2017 |
| KR | 101783916 | B1 | 10/2017 |
| KR | 20180000605 | A | 1/2018 |
| KR | 20180025805 | A | 3/2018 |
| KR | 20180028411 | A | 3/2018 |
| KR | 20180080908 | A | 7/2018 |
| KR | 2018-0093321 | A | 8/2018 |
| KR | 20190097666 | A | 8/2019 |
| KR | 102071835 | B1 | 1/2020 |
| KR | 20200023852 | A | 3/2020 |
| KR | 20200058222 | A | 5/2020 |
| KR | 20210008736 | A | 1/2021 |
| KR | 20210073451 | A | 6/2021 |
| WO | 2010004927 | A1 | 1/2010 |
| WO | 2017094252 | A1 | 6/2017 |
| WO | 2018060773 | A1 | 4/2018 |
| WO | 2018166882 | A1 | 9/2018 |
| WO | 2020197278 | A1 | 10/2020 |
| WO | 2021194285 | A1 | 9/2021 |

OTHER PUBLICATIONS

Besley, T., "The Importance of Adhesive Strength: How to be sure your Adhesive is Strong Enough" webpage, pp. 1-12, PDF of relevant website p. provided, retrieved on Feb. 6, 2025.

Masterbond "How Heat Affects the Lap Shear Strength of Structural Adhesives" webpage, pp. 1-3, PDF of relevant website pages provided, retrieved on Feb. 6, 2025.

The Epoxy Adhesive Test Measurement Guide (1999). 47 pgs, retrieved on Feb. 6, 2025.

International Search Report for corresponding PCT Application No. PCTKR20214012783 dated Jan. 6, 2022, 3 pgs [see p. 2, categorizing the cited references].

International Search Report for Application No. PCT/KR2022/006015 mailed Aug. 11, 2022, pp. 1-3. [see p. 2, categorizing the cited references].

International Search Report for Application No. PCT/KR2022/006013 mailed Aug. 23, 2022, pp. 1-3. [See p. 2, categorizing the cited references].

Machine Translation of: JP 2017-050215 A, Masuda et al., Sep. 3, 2017.

Search Report dated Aug. 12, 2025 from the Office Action for Chinese Application No. 202280006500.9 issued Aug. 14, 2025, pp. 1-3.

Extended European Search Report including Search Opinion for Application No. 21894853.7 dated Jun. 13, 2025. 8 pgs.

* cited by examiner

【FIG. 1】
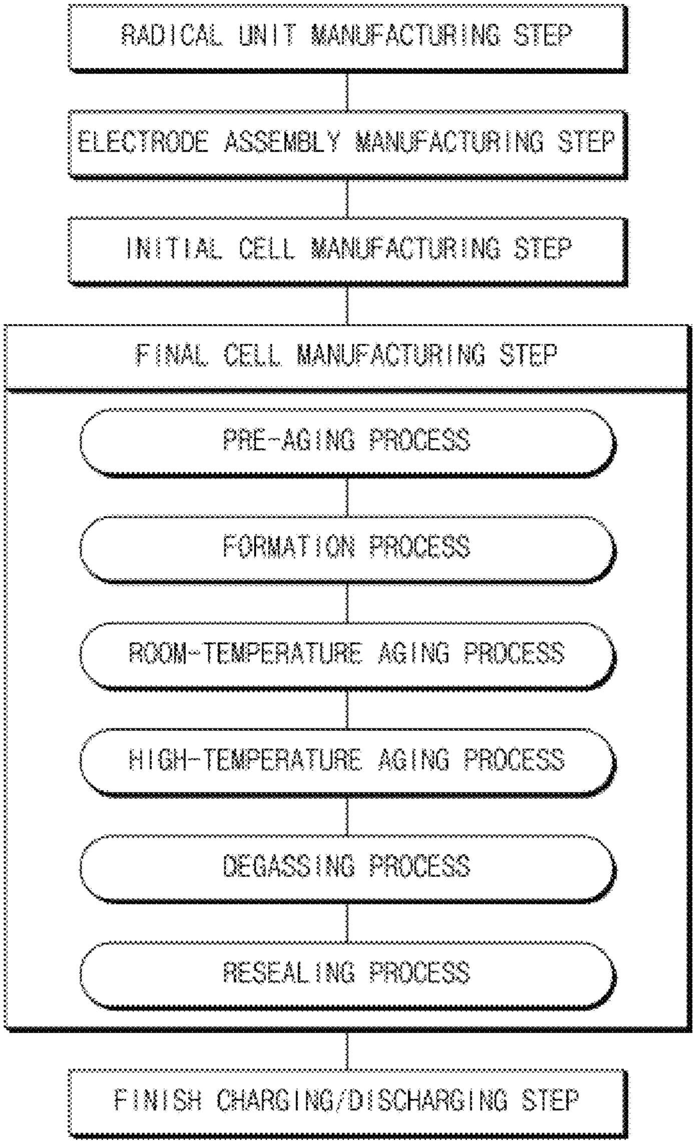

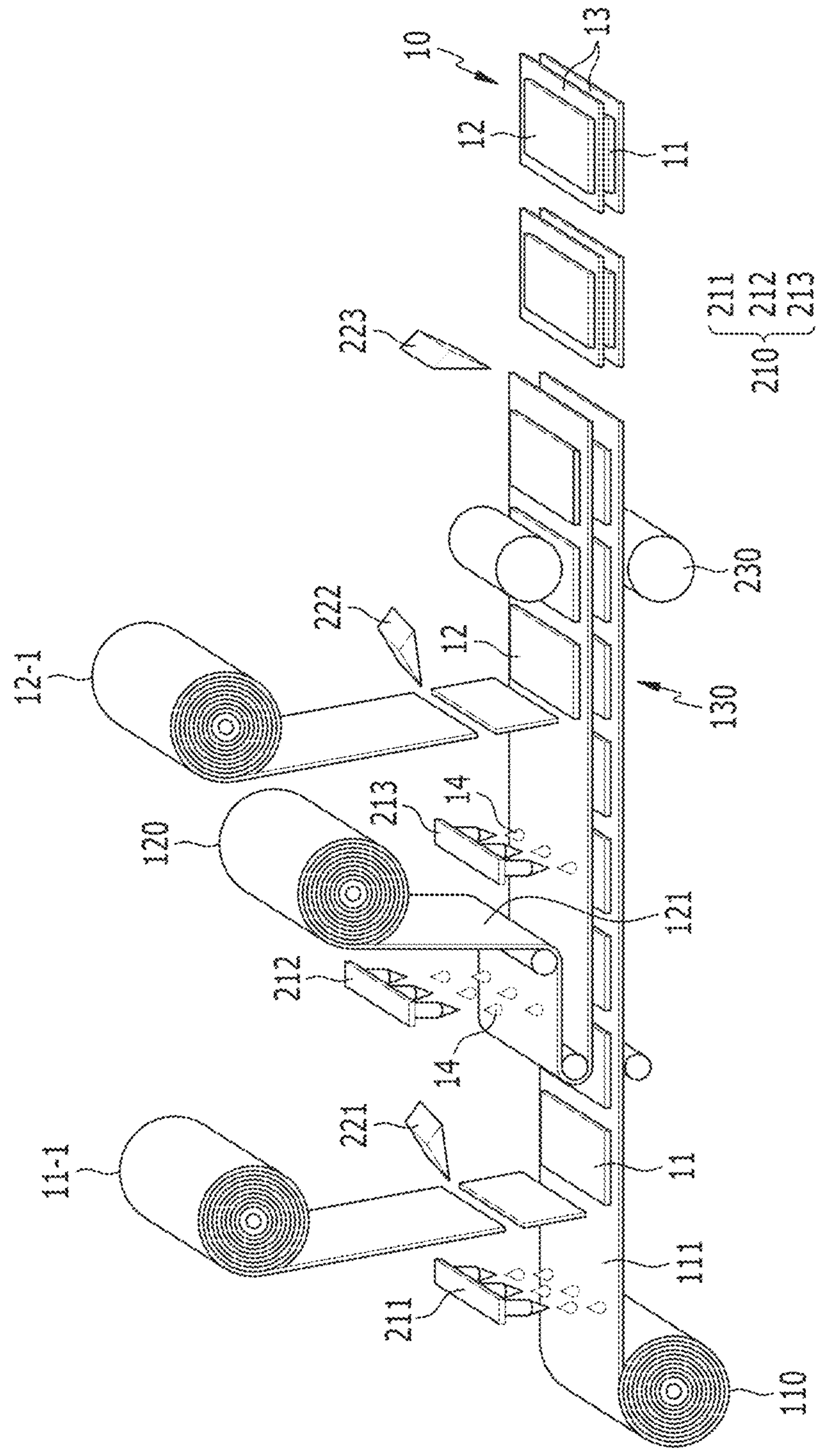
【FIG. 2】

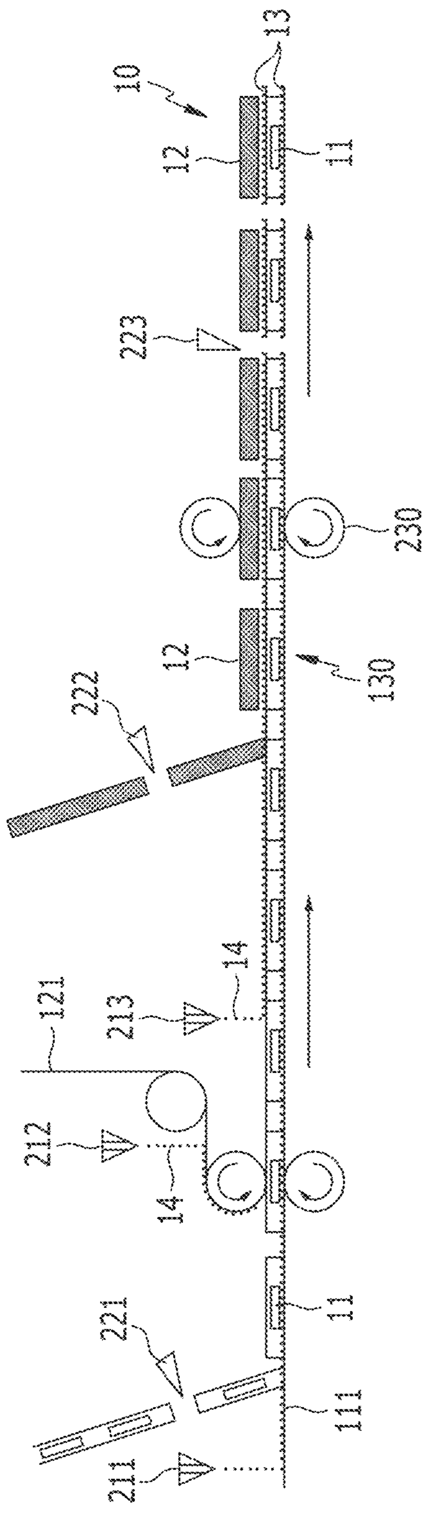
【FIG. 3】

【FIG. 4】
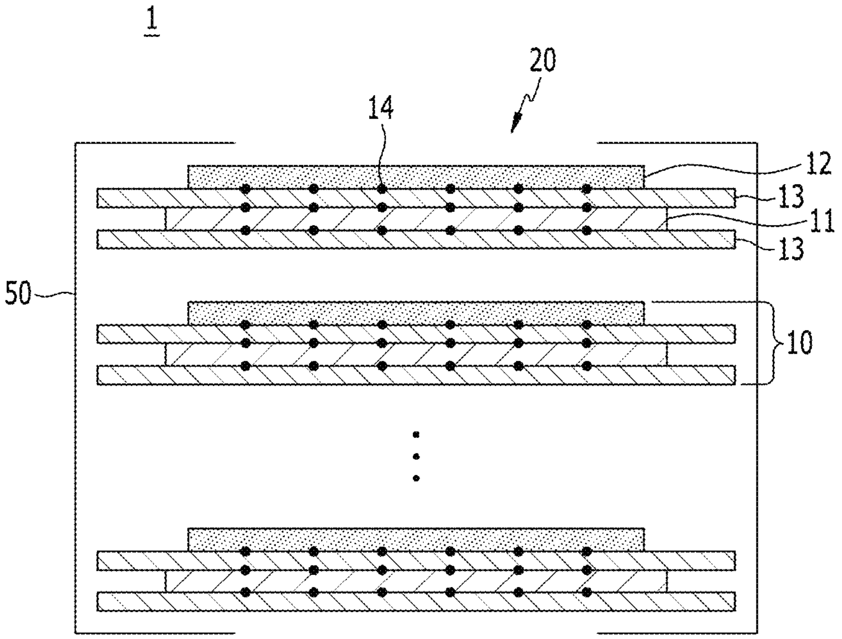
【FIG. 5】
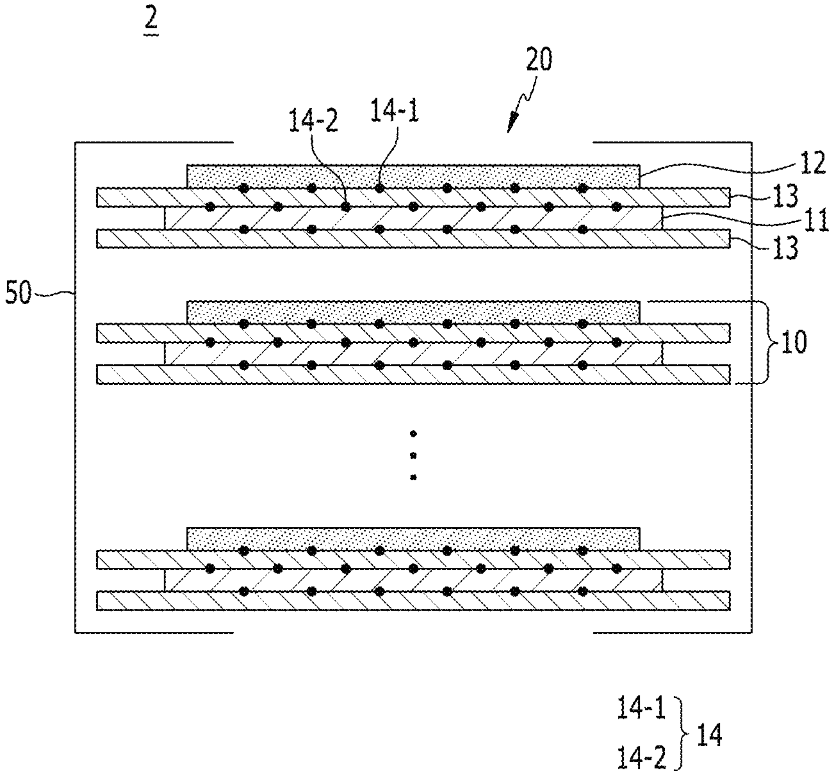

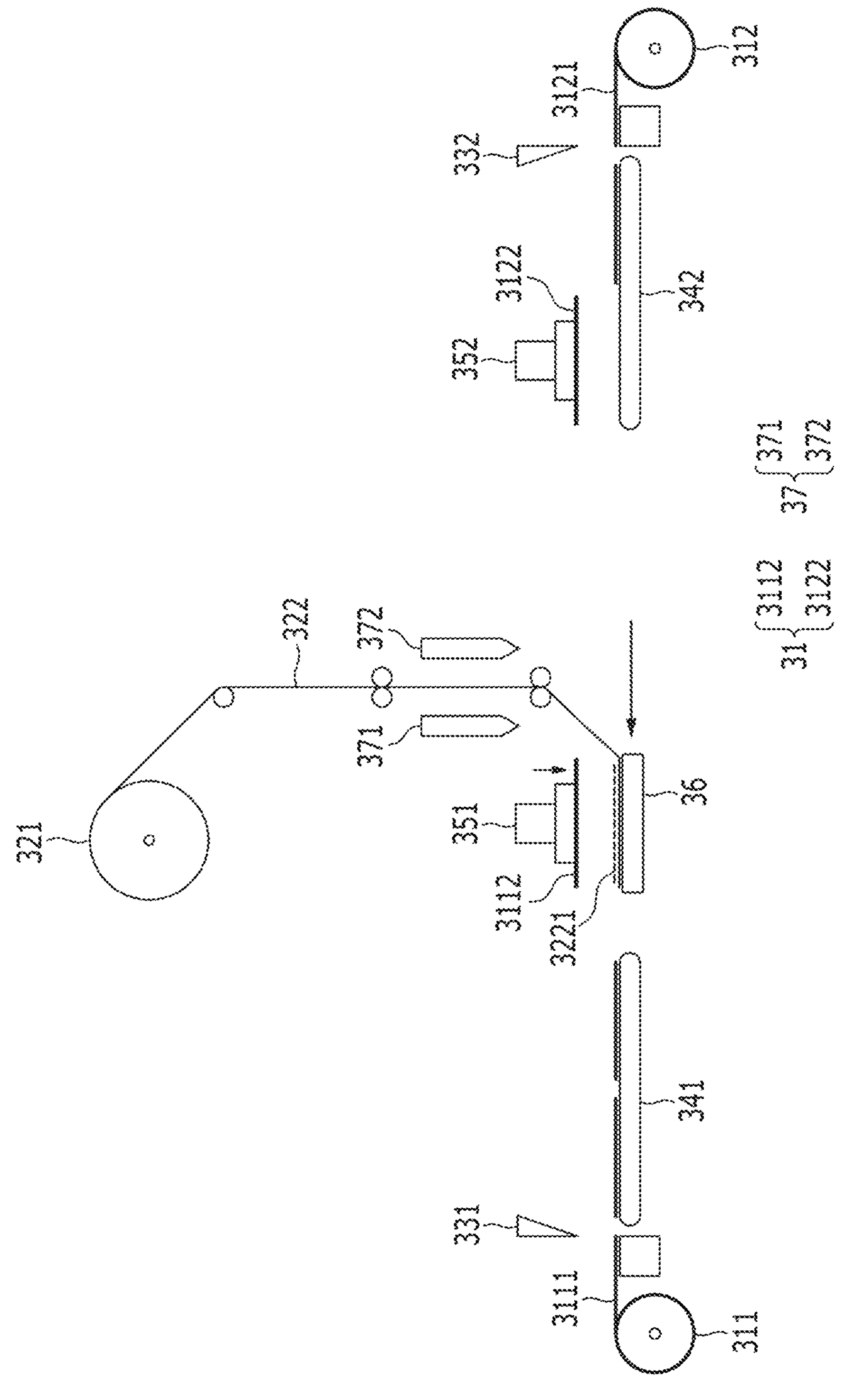
【FIG. 6】

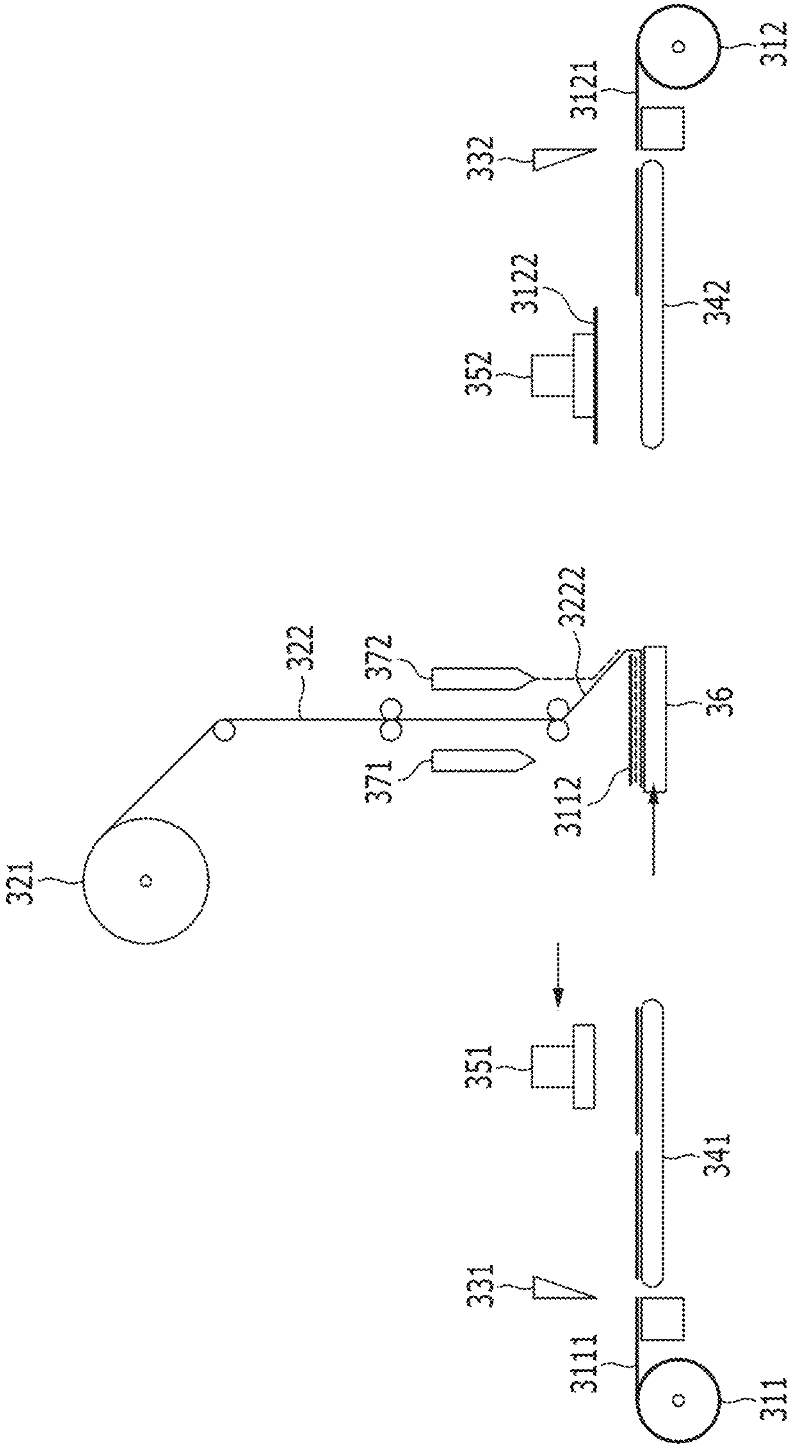
【FIG. 7】

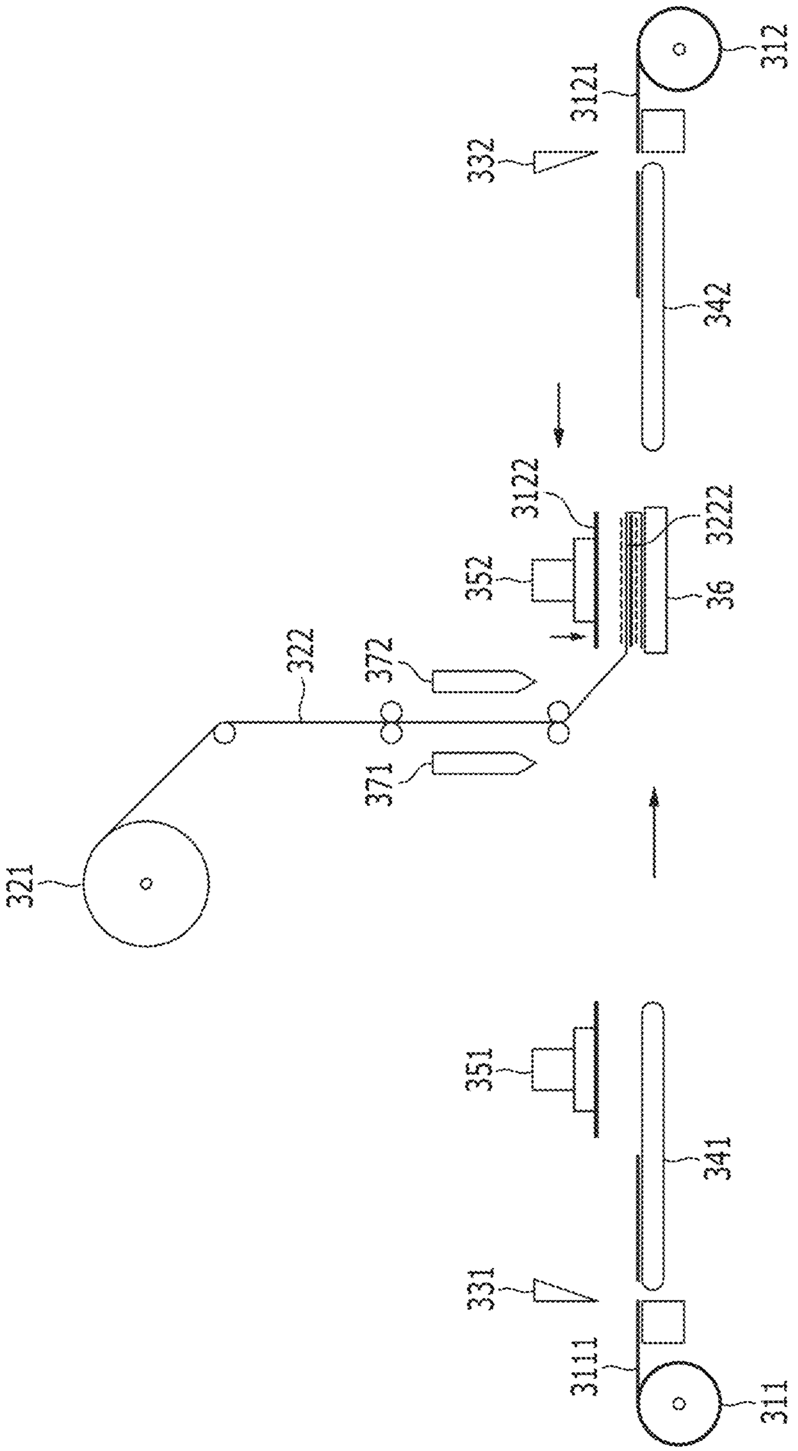
【FIG. 8】

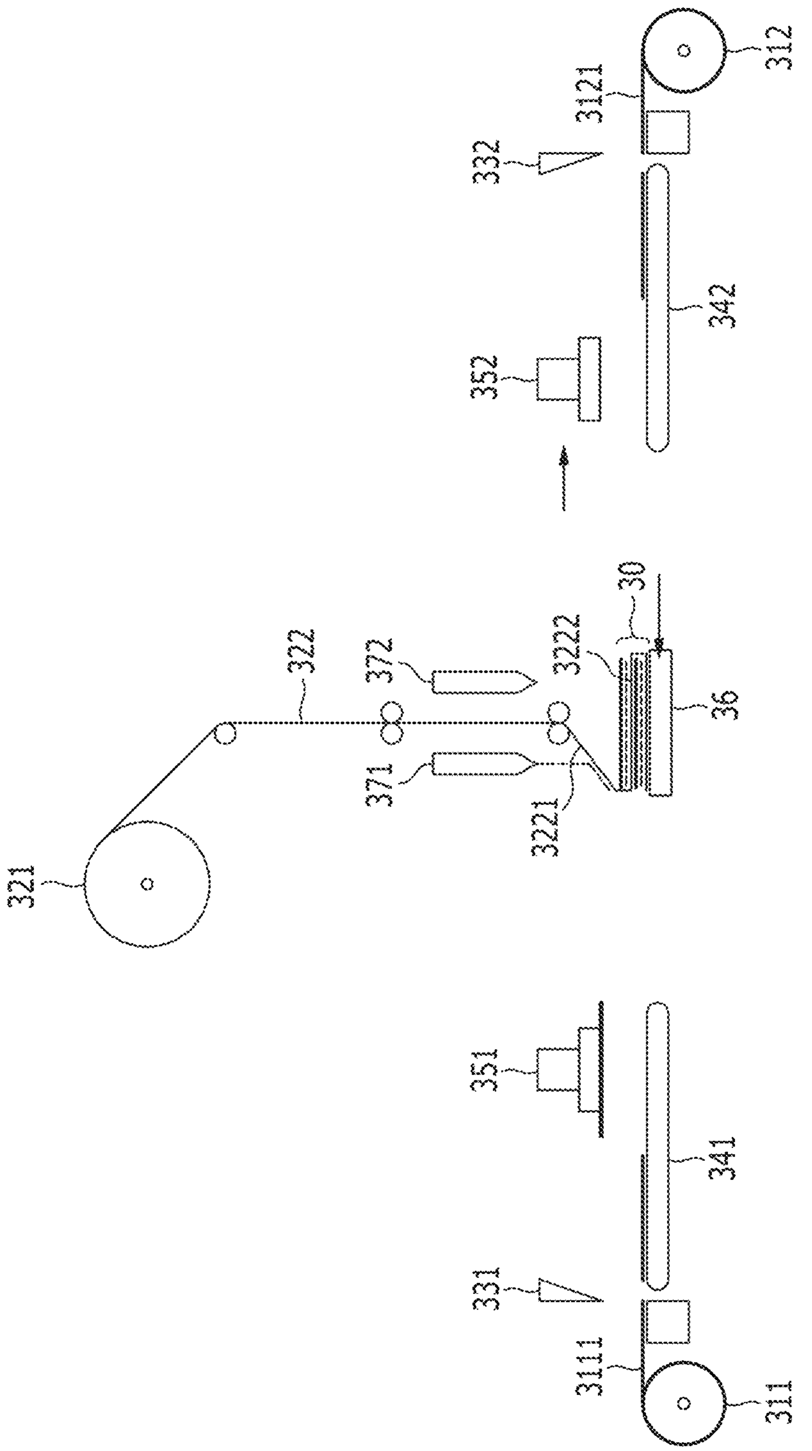
【FIG. 9】

【FIG. 10】
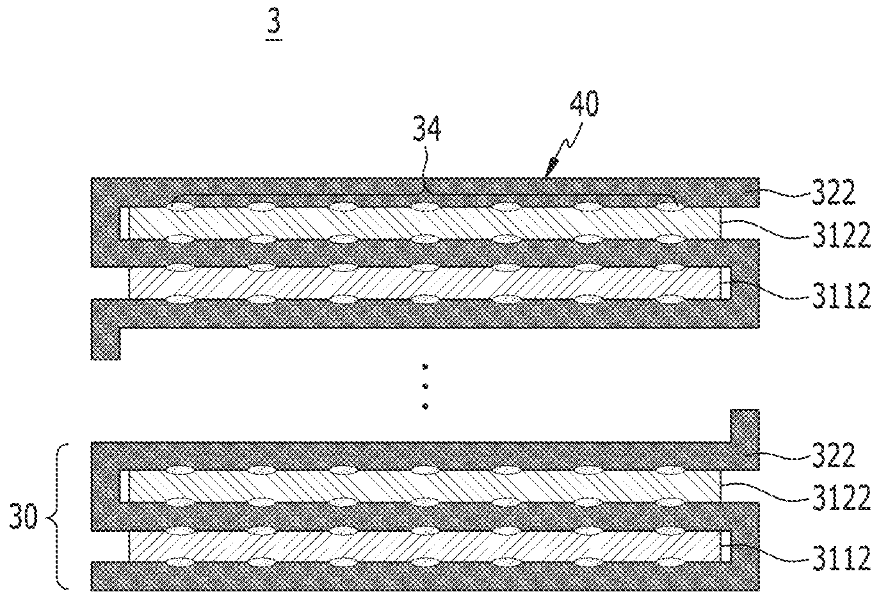
【FIG. 11】
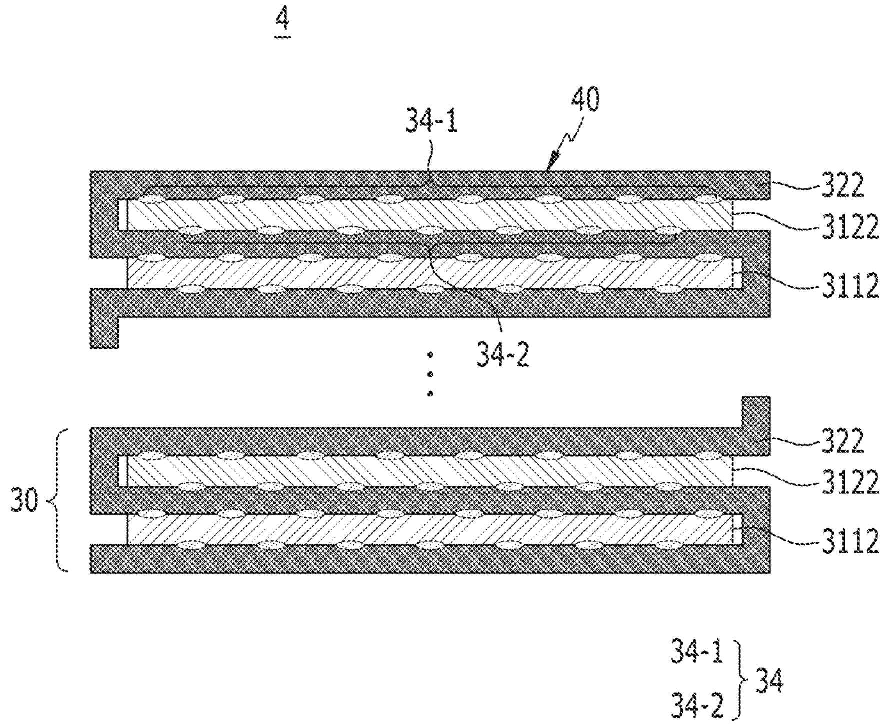

【FIG. 12】
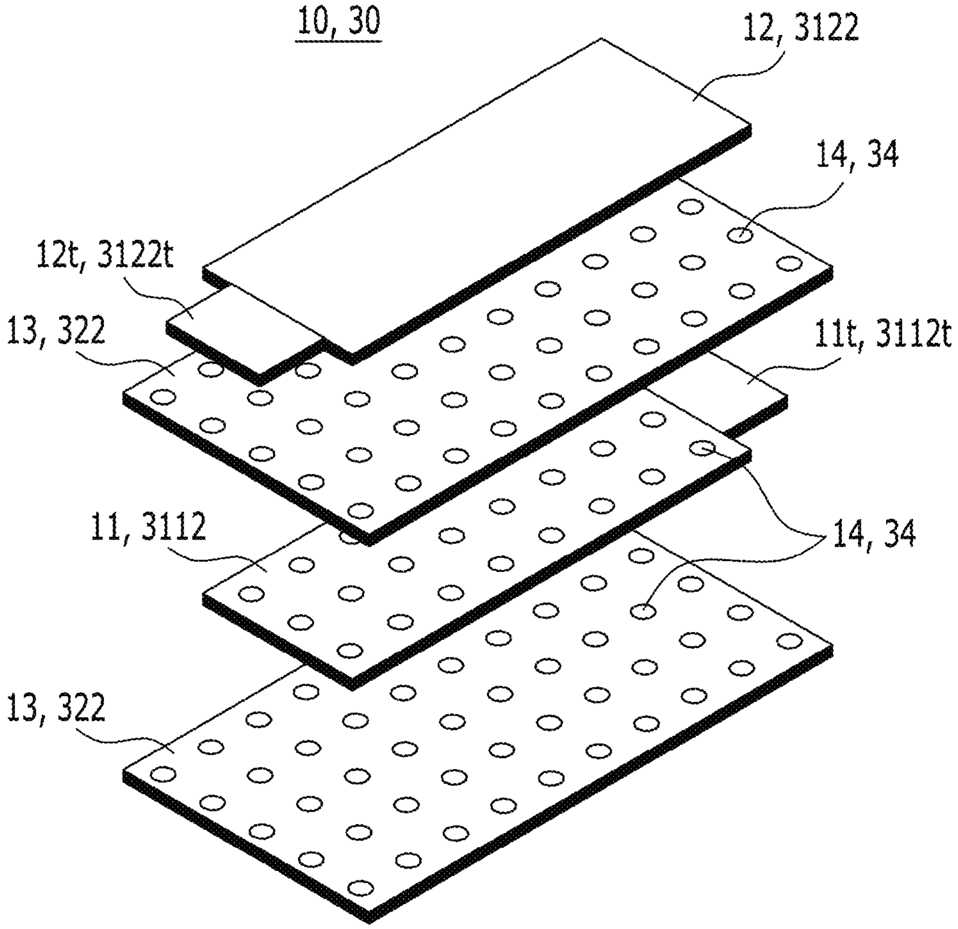

【FIG. 13】
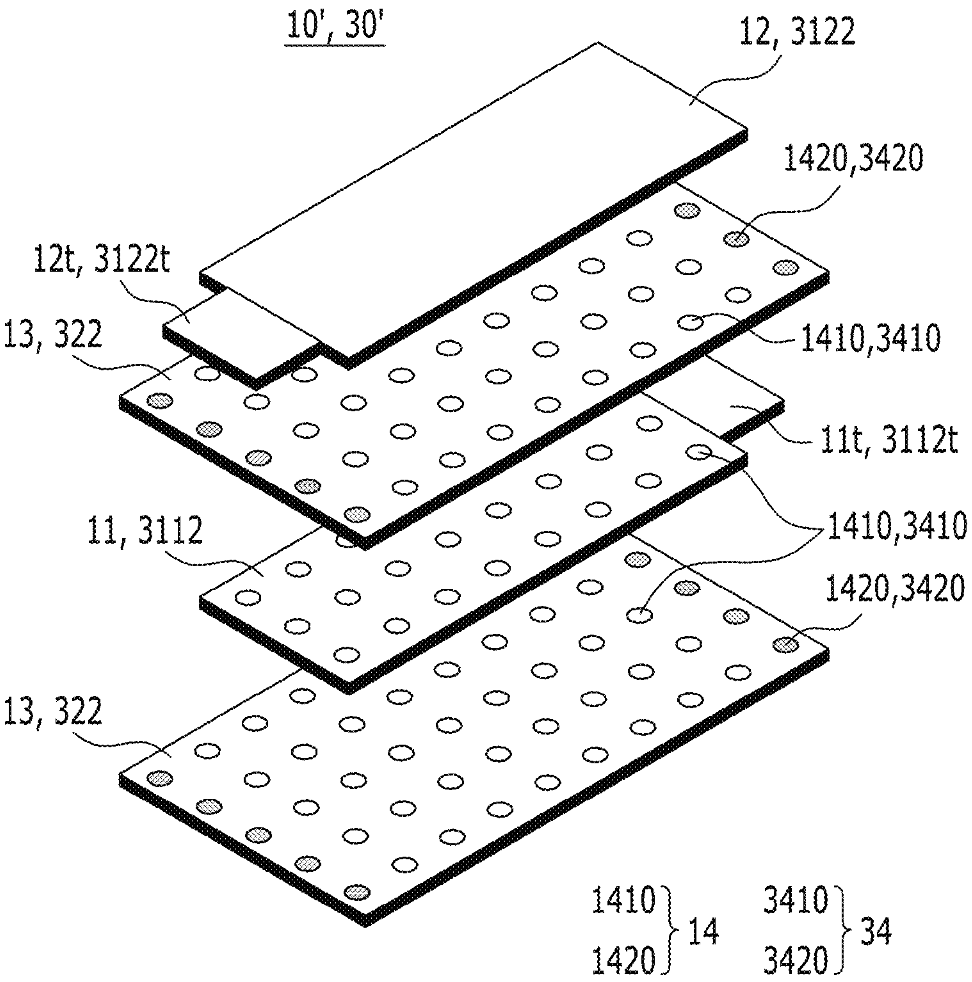

【FIG. 14】
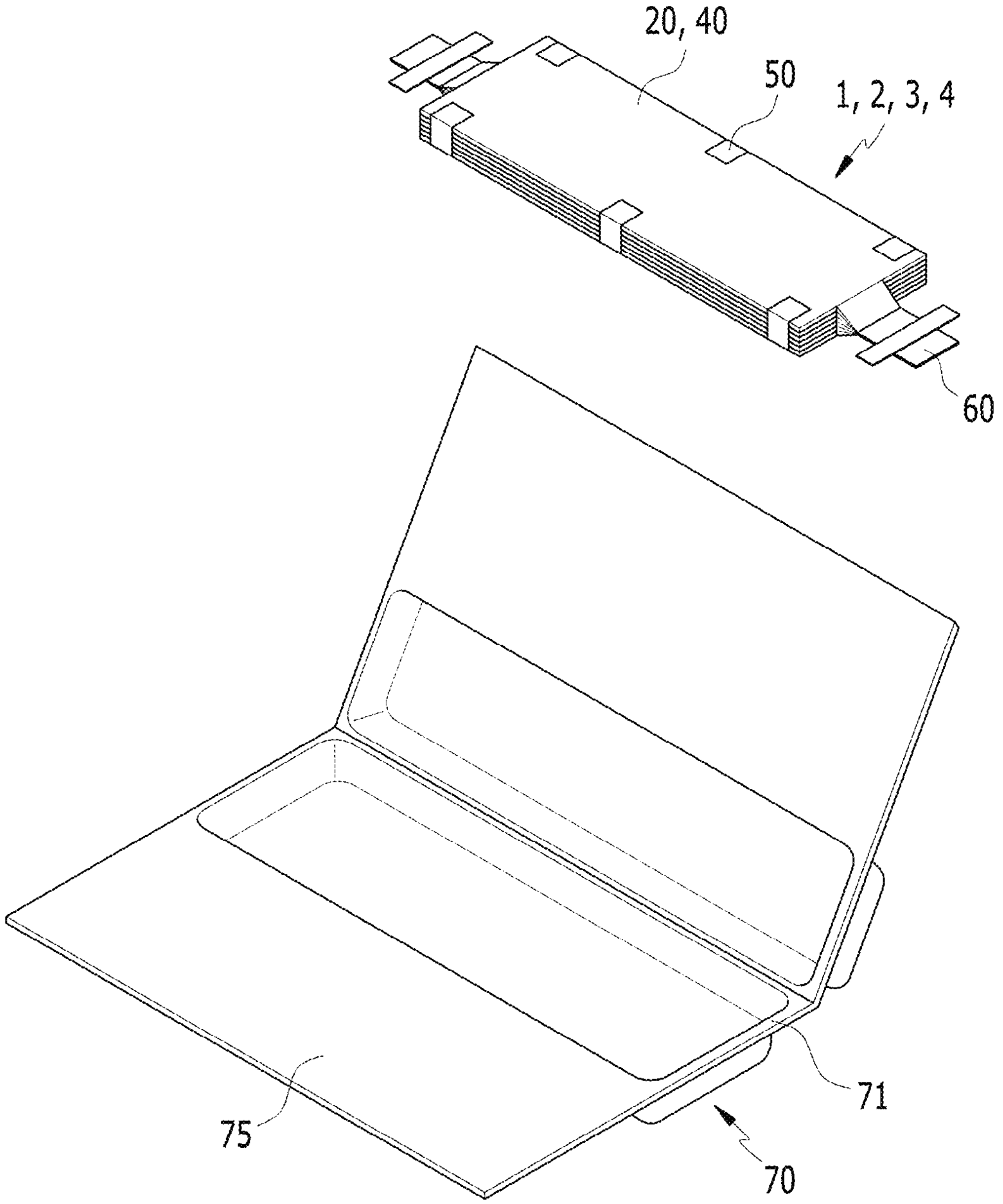

【FIG. 15】
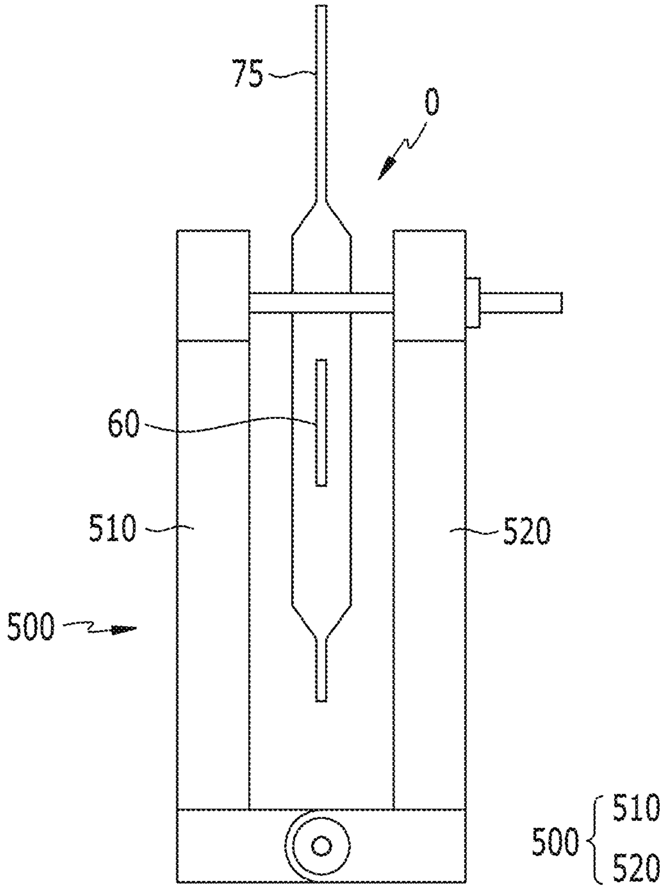

【FIG. 16】
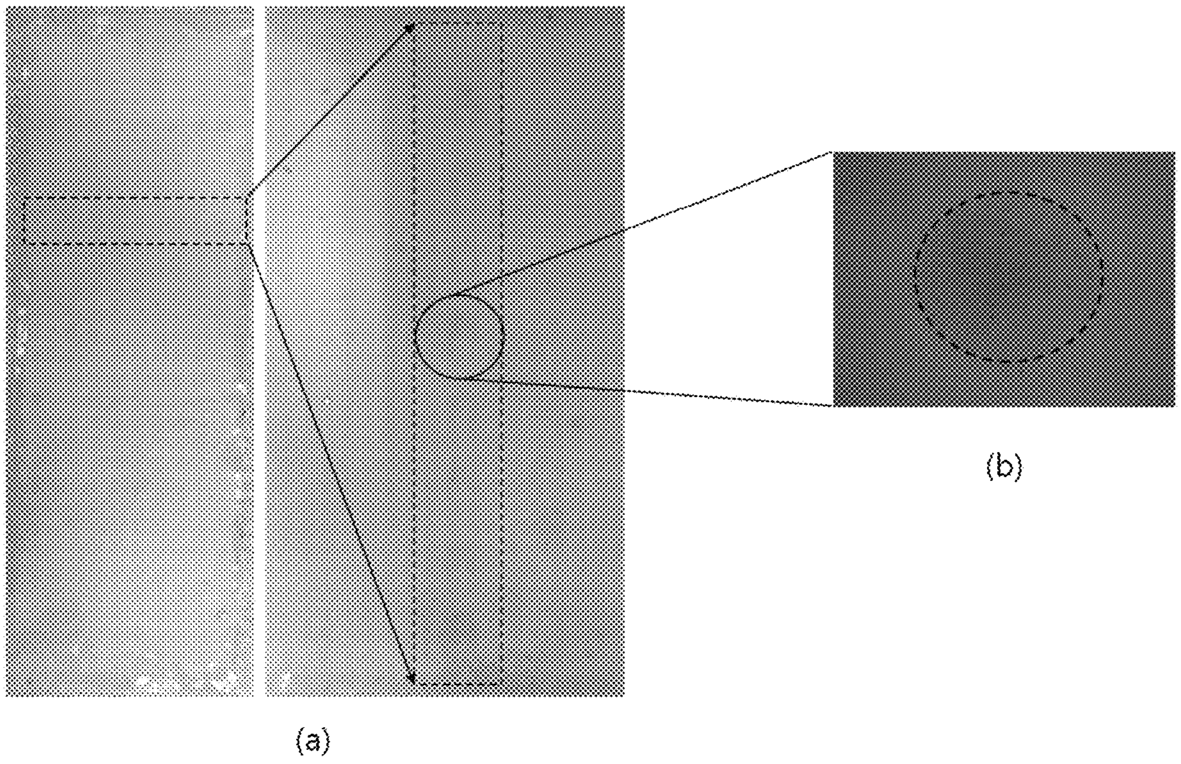

SECONDARY BATTERY AND MANUFACTURING METHOD THEREOF

CROSS-REFERENCE TO RELATED APPLICATIONS

This application is a divisional of U.S. application Ser. No. 17/476,125, now U.S. Pat. No. 11,799,173, filed on Sep. 17, 2021, which claims priority from Korean Patent Application No. 10-2020-0155000, filed on Nov. 18, 2020, and Korean Patent Application No. 10-2021-0124053, filed on Sep. 16, 2021, the entire disclosures of which are incorporated herein by reference.

TECHNICAL FIELD

The present invention relates to a secondary battery and a method for manufacturing the same, which method may prevent an electrode and/or a separator from shifting from a desired position when stacked during manufacturing to form a unit cell. Beneficially, some aspects of the invention may be capable of reducing production costs; reducing a defect rates during the manufacturing process, which may be caused by high-temperature heat and high pressure; and preventing deterioration of performance of the battery, when compared to methods for manufacturing a radical unit cell involving lamination, according to the related art.

BACKGROUND ART

In general, secondary batteries include nickel-cadmium batteries, nickel-hydrogen batteries, lithium ion batteries, and lithium ion polymer batteries. Such secondary batteries are used in small-sized products, such as digital cameras, P-DVDs, MP3Ps, mobile phones, PDAs, portable game devices, power tools, E-bikes, and the like, as well as large-sized products requiring high power, such as electric vehicles and hybrid vehicles, power storage devices for storing surplus power or renewable energy, and backup power storage devices.

In order to manufacture such a secondary battery, first, electrode active material slurry is applied to a positive electrode collector and a negative electrode collector to manufacture a positive electrode and a negative electrode, and then the electrodes are laminated on both sides of a separator, thereby forming an electrode assembly having a predetermined shape. Further, the electrode assembly is accommodated in a battery case, along with an electrolyte solution injected therein, and then the battery case is sealed.

The electrode assembly can be classified into various types. For example, a simple stack type electrode assembly includes a positive electrode, a separator, and a negative electrode continuously stacked on top of one another without manufacturing a unit cell. A lamination & stack (L&S) type electrode assembly includes a plurality of stacked unit cells, each of the unit cells being manufactured using positive electrodes, separators, and negative electrodes. A stack & folding (S&F) type electrode assembly includes a plurality of electrodes and/or unit cells attached to predetermined locations along one surface of an elongated separator sheet, and the separator sheet is repeatedly folded from one end thereof in a single direction such that the electrodes and/or unit cells become stacked with the separator following a spiral path through the stack. A Z-folding type of electrode assembly includes a plurality of electrodes and/or unit cells attached along alternating sides of an elongated separator sheet, and the separator sheet is folded from one end thereof back and forth repeatedly such that the electrodes and/or unit cells become stacked with the separator following a serpentine path through the stack.

In order to manufacture the lamination & stack type electrode assembly, the stack & fold type electrode assembly, or the Z-folding type electrode assembly, the unit cell may be manufactured first. In general, in order to manufacture a unit cell, the separator may be stacked on both top and bottom surfaces of a center electrode, and then an upper electrode may be further stacked at the uppermost end. In addition, a laminating process may be performed, in which heat and pressure are applied to the stack containing the electrode(s) and separator(s). The lamination process may result in the electrode(s) and separator(s) being bonded to each other relatively firmly to form the unit cell.

However, in such related art, the electrode and the separator are not bonded to each other until the lamination process is performed on the stack. Until that point, in preparation for the lamination process, the electrode(s) and separator(s) are stacked, but are only in contact with each other. Therefore, a problem that can occur before the lamination process is performed is that the electrodes may shift from their desired positions, such as in the process of transferring the stack. In addition, since the laminating process applies high-temperature heat and high pressure to the stack, the electrodes may become damaged. Furthermore, recently a separator capable of adhering to electrodes even with low-temperature heat and low pressure has been developed, but such separator is expensive, which leads to high manufacturing cost, and it also reduces process efficiency.

DISCLOSURE OF THE INVENTION

Technical Problem

At least some formulations of the present invention are believed to solve the above and other problems. For example, some aspects of the present invention provide a secondary battery and a method for manufacturing the same. In such secondary battery, an electrode or a separator may be prevented from being moved from their desired positions during the manufacturing process, such as when fabricating a unit cell by stacking the electrode(s) and separator(s).

It is believed that at least some implementations of the present invention will reduce production costs; reduce rates of defects in the manufacturing process, which may be caused by high-temperature heat and high pressure; and prevent deterioration of the performance of the battery, when compared to methods for manufacturing a radical unit cell involving lamination, according to the related art.

Technical Solution

A method for manufacturing a secondary battery according to an aspect of the present invention may include: assembling an electrode assembly having a plurality of electrodes separated by at least one separator positioned between each of the electrodes; sealing the electrode assembly and an electrolyte solution in a battery case; and dissolving at least a portion of an adhesive into the electrolyte solution such that a mark from the adhesive is left on the separator. In accordance with that aspect of the invention, the step of assembling the electrode assembly preferably includes adhering a first one of the plurality of electrodes to the at least one separator with the adhesive positioned between the first electrode and the separator.

In accordance with other aspects of the above invention, the method may further comprise a formation process in which the battery cell is charged at a high temperature to activate the battery cell, and the step of dissolving the adhesive into the electrolyte solution preferably occurs during the formation process. In accordance with such aspects of the invention, the high temperature is preferably higher than room temperature.

In accordance with some aspects of the invention, the formation process may be performed at a temperature of 50 °C to 70 °C.

In accordance with some aspects of the invention, the formation process may further include the step of compressing opposing side surfaces of the battery cell. In some of such aspects of the invention, the formation process may be performed at a temperature of 50 °C to 70 °C, and the adhesive may be completely dissolved into the electrolyte solution during the formation process, such that none of the adhesive remains on a surface of the first electrode.

In accordance with other aspects of the invention, the adhesive may be an acrylate-based adhesive, and the electrolyte solution may be an organic solvent.

In accordance with other aspects of the invention, the method may further comprise: stacking a plurality of radical units to form the electrode assembly, and securing the plurality of radical units together by a fixing tape extending at least partially around a circumference of the electrode assembly. In accordance with such aspects of the invention, each of the radical units may include at least one of the plurality of electrodes adhered to at least one respective separator by the adhesive positioned therebetween.

In accordance with the above aspects of the invention, the step of stacking the plurality of radical units may comprise the steps of: unwinding a lower separator sheet from a lower separator reel; applying the adhesive to at least a portion of a surface of the unwound lower separator sheet; positioning a lower surface of the first electrode in contact with the portion of the surface of the lower separator sheet to which the adhesive is applied; unwinding an upper separator sheet from an upper separator reel; applying the adhesive to at least a portion of a first surface of the unwound upper separator sheet; positioning the portion of the first surface of the upper separator sheet to which the adhesive is applied in contact with an upper surface of the first electrode; applying the adhesive to at least a portion of a second surface of the upper separator sheet; and positioning a second electrode in contact with the portion of the second surface of the upper separator sheet to which the adhesive is applied.

According to some of the above aspects of the invention, the adhesive may be applied to the surface of the lower separator sheet and to the first and second surfaces of the upper separator sheet in the form of an arrangement of a plurality of dots of the adhesive spaced apart over the respective surface.

According to other aspects of the above invention, the step of assembling the electrode assembly may comprise forming a stack of the plurality of electrodes in which the at least separator sheet is folded to extend across and separate the plurality of electrodes in the stack.

In accordance with some of the above aspects of the invention, the step of forming the stack may comprise the steps of: unwinding an electrode sheet from an electrode reel to form the plurality of electrodes; unwinding the at least one separator from a separator reel; positioning at least a first portion of the at least one separator on a supporting surface; and positioning the first surface of the first electrode in contact with the first portion of the at least one separator positioned on the supporting surface.

In accordance with some of the above aspects of the invention, the method may further comprise: folding the at least one separator after positioning the first surface of the first electrode in contact with the first portion of the at least one separator, such that a second portion of the at least one separator extends across a second surface of the first electrode; and positioning a second one of the plurality of electrodes on the second portion of the at least one separator after folding the at least one separator such that the second portion extends across the second surface of the first electrode.

In accordance with some aspects of the invention, the adhesive may preferably be applied in the form of an arrangement of a plurality of spaced-apart dots of the adhesive.

Other aspects of the present invention provide a secondary battery. A secondary battery according to aspects of the present invention may include: an electrode assembly; and a battery case for accommodating the electrode assembly and an electrolyte solution therein. In accordance with such aspects of the invention, the electrode assembly may include a plurality of electrodes and at least one separator alternately stacked in a stack, such that at least one interface is defined between a surface of the at least one separator and a first one of the plurality of electrodes. Further, in accordance with such aspects of the invention, an adhesive may be dissolved into the electrolyte solution, and a mark formed by the adhesive before being dissolved remains on the surface of the at least one separator along the at least one interface.

According to some of the above aspects of the invention, the mark may be in the form of an arrangement of a plurality of dots spaced apart on the surface of the at least one separator along the at least one interface.

Further, according to some of the above aspects of the invention, the adhesive may be an acrylate-based adhesive, and the electrolyte solution may be an organic solvent.

According to some aspects of the invention, the plurality of electrodes may include a first electrode and a second electrode; the at least one separator may include an upper separator and a lower separator; and the plurality of electrodes and the at least one separator may be alternately stacked in the following order: the lower separator, the first electrode, the upper separator, and the second electrode.

According to some aspects of the invention, the plurality of electrodes in the stack may include a first electrode and a second electrode, and the at least one separator may be elongated and folded to follow a serpentine path through the stack, such that: a first portion of the at least one separator extends across a first side of the first electrode, a second portion of the at least one separator extends across a second side of the first electrode and across a first side of the second electrode, and a third portion of the at least one separator extends across a second side of the second electrode.

According to some of the above aspects of the invention, an electrode tab may be positioned at an end of the first electrode, an adhesive layer may be disposed between the electrode tab and the at least one separator, and the adhesive layer may comprise a second adhesive that is not dissolved in the electrolyte solution. According to some of such aspects of the invention, the adhesive layer may be defined by an arrangement of a plurality of spaced-apart dots of the second adhesive.

A method for manufacturing a secondary battery according to another aspect of the present invention may include assembling an electrode assembly and then sealing the electrode assembly and an electrolyte solution in a battery case to thereby form a battery cell. In accordance with this aspect of the present invention, the electrode assembly may be defined by a stack of a plurality of electrodes separated from each other by an elongated separator following a serpentine path through the stack between each of the successive electrodes. An interface may be defined between each face of each electrode and the portion of the separator that extends across each face, such that a first portion of the separator extends across a first face of a first electrode to define a first interface therebetween; a second portion of the separator extends across a second face of the first electrode to define a second interface therebetween and the second portion of the separator extends across a first face of a second electrode to define a third interface therebetween; and a third portion of the separator extends across a second face of the second electrode to define a fourth interface therebetween. The plurality of electrodes may be adhered to the at least one separator by a respective layer of an adhesive disposed along each of the interfaces. Each layer of the adhesive may be defined by an arrangement of a plurality of dots of the adhesive spaced apart across the respective interface. The plurality of dots may be arranged such that the positions of the dots in each layer are staggered with respect to the positions of the dots in the successive layer. The method according to this aspect of the invention may further include dissolving at least a portion of the adhesive into the electrolyte solution such that a mark from the adhesive is left on the at least one separator.

A secondary battery according to another aspect of the present invention may include an electrode assembly and an electrolyte solution sealed in a battery case, wherein the electrolyte solution includes an adhesive dissolved therein. In accordance with this aspect of the present invention, the electrode assembly may be defined by a stack of a plurality of electrodes separated from each other by an elongated separator following a serpentine path through the stack so as to form a respective separator layer between each of the successive electrodes. An interface may be defined between each face of each electrode and the portion of the separator that extends across each face, such that a first portion of the separator forming a first separator layer extends across a first face of a first electrode to define a first interface therebetween; a second portion of the separator forming a second separator layer extends across a second face of the first electrode to define a second interface therebetween and the second portion of the separator extends across a first face of a second electrode to define a third interface therebetween; and a third portion of the separator forming a third separator layer extends across a second face of the second electrode to define a fourth interface therebetween. Each separator layer may include an arrangement of a plurality of dots defined by marks formed by the adhesive before being dissolved, the plurality of dots being spaced apart across the respective separator layer. The plurality of dots may be arranged such that the positions of the dots in each separator layer are staggered with respect to the positions of the dots in the successive separator layer.

Advantageous Effects

The secondary battery and the method for manufacturing the same according to the present invention are configured such that an adhesive is applied to at least one surface of an electrode or a separator in an electrode stack in order to allow the electrode and the separator to adhere to each other. The electrode assembly is accommodated together with an electrolyte solution in a pouch case, and at least a portion of the adhesive becomes dissolved in the electrolyte solution. As a result, an application mark of the adhesive remains on the separator, which application mark does not include a component of the adhesive.

Therefore, the adhesive preferably prevents the electrode or the separator from moving from a desired position when manufacturing the electrode assembly. In addition, it may be possible to substantially prevent deterioration of battery performance due to the presence of the adhesive between the electrodes and separators, specifically by having the adhesive becoming dissolved into the electrolyte solution in the battery cell.

BRIEF DESCRIPTION OF THE DRAWINGS

FIG. 1 is flowchart illustrating a method for manufacturing a secondary battery according to an embodiment of the present invention.

FIG. 2 is a perspective view illustrating a radical unit manufacturing step in the method for manufacturing the secondary battery according to an embodiment of the present invention.

FIG. 3 is a front view illustrating the radical unit manufacturing step in the method for manufacturing the secondary battery according to an embodiment of the present invention.

FIG. 4 is a cross-sectional view of an electrode assembly formed by stacking radical units manufactured using the radical unit manufacturing step in the method for manufacturing the secondary battery according to an embodiment of the present invention.

FIG. 5 is a cross-sectional view of an electrode assembly formed by stacking radical units manufactured using the radical unit manufacturing step in the method for manufacturing the secondary battery according to another embodiment of the present invention.

FIGS. 6 to 9 are schematic views illustrating the radical unit manufacturing step in the method for manufacturing the secondary battery according to another embodiment of the present invention.

FIG. 10 is a cross-sectional view of an electrode assembly manufactured by repeatedly forming the radical unit manufactured using the radical unit manufacturing step in the method for manufacturing the secondary battery according to another embodiment of the present invention.

FIG. 11 is a cross-sectional view of an electrode assembly manufactured by repeatedly forming the radical unit manufactured using the radical unit manufacturing step in the method for manufacturing the secondary battery according to yet another embodiment of the present invention.

FIGS. 12 and 13 are exploded perspective views of a radical unit manufactured using the radical unit manufacturing step in the method for manufacturing the secondary battery according other embodiments of the present invention.

FIG. 14 is a perspective view illustrating an initial cell manufacturing step in the method for manufacturing the secondary battery according to another embodiment of the present invention.

FIG. 15 is a front view illustrating a formation process in a method for manufacturing a secondary battery according to an embodiment of the present invention.

FIG. 16 is a view showing an application mark of the adhesive remaining on the surface of the separator.

MODE FOR CARRYING OUT THE INVENTION

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but rather should be interpreted consistently with the concepts disclosed in the present application, based on the principle that an inventor can act as his/her own lexicographer, defining terms so as to best describe and explain his or her invention.

FIG. 1 is flowchart illustrating a method for manufacturing a secondary battery according to an embodiment of the present invention.

Referring to FIGS. 1 to 3, a method for manufacturing a secondary battery according to an embodiment of the present invention may include a radical unit manufacturing step, an electrode assembly manufacturing step, an initial cell manufacturing step, and a final cell manufacturing step.

In the method for manufacturing a secondary battery according to an embodiment of the present invention, the radical unit manufacturing step and the electrode assembly manufacturing step will be mainly described below. Any other aspects of the manufacturing process or systems disclosed in Korean Patent Application No. 2020-0036394, filed on Mar. 25, 2020, or in Korean Patent Application No. 2020-0036395, filed on Mar. 25, 2020, may be utilized in the manufacturing method herein, and the entire disclosures of such applications are incorporated by reference in the present application.

FIG. 2 is a perspective view illustrating a radical unit manufacturing step in the method for manufacturing the secondary battery according to an embodiment of the present invention. FIG. 3 is a front view illustrating the radical unit manufacturing step in the method for manufacturing the secondary battery according to an embodiment of the present invention.

First, in accordance with some embodiments of the present invention, a radical unit 10 may be a stacked unit of at least one electrode and at least one separator 13. That is, electrodes and separators 13 may be sequentially stacked to form one radical unit 10. An electrode stack 20 may then be formed by stacking a plurality of radical units 10.

In the method for manufacturing the secondary battery according to some embodiments of the present invention, the radical unit manufacturing step may include a step of applying an adhesive 14 to at least one surface of an electrode or a separator 13 to create a radical unit 10 in which the electrode and the separator 13 adhere to each other.

Referring to FIGS. 2 and 3, the radical unit manufacturing step may include a step of unwinding a lower separator sheet 111 from a lower separator reel 110. In addition, the radical unit manufacturing step may include a step of applying an adhesive 14 to at least a portion of a surface (e.g., an upper surface) of the unwound lower separator sheet 111 via a first nozzle 211. The first nozzle 211 may apply the adhesive 14 in the form of a plurality of dots. Next, a step including positioning a first electrode 11 on a surface of the lower separator sheet 111 may be performed, that surface of the lower separator sheet 111 being the surface to which the adhesive 14 had been applied by the first nozzle 211. The first electrode 11 may have been created by unwinding an elongate sheet of the first electrode material from a first electrode reel 11-1 and cutting the sheet to a predetermined size using a first cutter 211, so as to result in the first electrode 11 to be positioned on the adhesive-applied surface of the lower separator sheet 111. The first electrode 11 and the lower separator may thus adhere to each other by the adhesive 14 that had been applied by the first nozzle 211.

The method for manufacturing the secondary battery according to some embodiments of the present invention may also include a step of unwinding an upper separator sheet 121 from an upper separator reel 120. While the upper separator sheet 121 is unwound, a step including applying adhesive 14 to at least a portion of a surface of the unwound upper separator sheet 121 via a second nozzle 212 may be performed. That surface of the upper separator sheet 121 to which the adhesive 14 is applied may be the surface that will come into contact with the first electrode 11. The second nozzle 212 may apply the adhesive 14 in the form of a plurality of dots.

Referring to FIG. 2, after the second nozzle 212 applies the adhesive 14 to a surface of the upper separator sheet 121, the upper separator sheet 121 may be inverted (e.g., by reorienting the upper separator sheet 121 such that the adhesive-applied surface goes from facing upwardly to facing downwardly). Beneficially, the above adhesive application and separator inversion steps may allow the adhesive 14 to be applied downwardly from the second nozzle 212, which may take advantage of gravity to bring the drops of adhesive into contact with the upper separator sheet 121. Then, by simply inverting the upper separator sheet 121, the adhesive-applied surface of the upper separator sheet 121 may be brought into contact with the first electrode 11.

When the upper separator sheet 121 is inverted upside down to adhere to the first electrode 11, a step of applying adhesive 14 to at least a portion of the opposing surface of the upper separator sheet 121 via a third nozzle 213 may be performed. That opposing surface of the upper separator sheet 121 may be on the opposite side of the upper separator sheet 121 to the surface to which the adhesive 14 was applied by the second nozzle 212. Thus, the adhesive 14 may be applied downwardly from the third nozzle 213 to the upper separator sheet 121 after the upper separator sheet 121 has been inverted, as discussed above. Like the first and second nozzles, the third nozzle 213 may apply the adhesive 14 in the form of a plurality of dots.

After the third nozzle 213 applies the adhesive 14, the radical unit manufacturing step of the method for manufacturing the secondary battery according to some embodiments of the present invention may include a step of positioning the second electrode 12 on the upper separator sheet 121. Specifically, such step may include positioning the second electrode on the surface of the upper separator sheet 121 to which the adhesive 14 was applied by the third nozzle 213. Like the first electrode 11, the second electrode 12 may have been formed by cutting a sheet of the second electrode material unwound from a second electrode reel 12-1 using a second cutter 222. As a result, a four-layered structure may be formed. That is, after the step of positioning the second electrode 12 on the upper separator sheet 121, the four-layered stack 130 may include: the lower separator sheet 111, the first electrode 11, the upper separator sheet 121, and the second electrode 12 sequentially stacked on one another.

In addition, a pressure applying step of the method may involve a pressing nip roll 230 applying pressure to the four-layered stack 130 while rotating. That is, as shown in FIGS. 2-3, opposing nip rollers 230 may be positioned on opposing sides of the stack 130, such that compressive pressure is applied to the stack 130 as it passes between the rollers 230. Such pressure applying step may cause the electrodes and the separators 13 to adhere to each other, which may beneficially prevent the stack 130 from delaminating. The pressure applied to the stack 130 by the rollers 230 may be less (and is preferably substantially less) than the high pressure (and high temperature) applied during the lamination process according to the related art.

As illustrated in FIGS. 2 and 3, after the step of applying pressure to the four-layered stack 130, a step of cutting the four-layered stack 130 at predetermined intervals using the cutter may be further performed. That is, a portion of the upper separator sheet 121 and a portion of the lower separator sheet 111, which portions are positioned along a space defined between successive electrodes, may be cut using a third cutter 223. By cutting those portions of the upper separator sheet 121 and lower separator sheet, the radical unit 10 may be realized.

According to the radical unit manufacturing step in the method for manufacturing the secondary battery according to some embodiments of the present invention, when the electrode(s) and the separator(s) are stacked to manufacture the unit cell (i.e., the radical unit), the adhesive 14 may have been previously applied to the separator sheets 111 and 121 whenever the electrode is seated on the separator sheets 111 and 121, to prevent the electrode from being displaced.

Since the present invention may obviate the need to perform a laminating process, a defect rate caused by high-temperature heat and high pressure may be reduced. Also, without the laminating process, the inventive unit cell manufacturing apparatus may have a reduced volume, and/or the manufacturing process may be simplified.

FIG. 4 is a cross-sectional view of an electrode assembly 1 formed by stacking radical units 10 manufactured using the radical unit manufacturing step in the method for manufacturing the secondary battery according to a first embodiment of the present invention. FIG. 5 is a cross-sectional view of an electrode assembly formed by stacking radical units manufactured through the radical unit manufacturing step in the method for manufacturing the secondary battery according to a second embodiment of the present invention.

In the method for manufacturing the secondary battery according to the embodiment illustrated in FIG. 4, the electrode assembly manufacturing step may include a step of attaching fixing tape 50 along at least a portion of a circumference of the electrode stack 20, so as to create the electrode assembly 1. Here, the electrode assembly manufacturing step may be performed separately from the above-mentioned radical unit manufacturing step, or the above-mentioned radial unit manufacturing step may be included in the electrode assembly manufacturing step.

In the radical unit 10, the electrodes 11 and 12 and the separators 13 may be adhered to each other by the adhesive 14. As a result, the electrodes 11 and 12 and the separators 13 may be maintained in the desired alignment by adhesion force of the adhesive 14. In addition, the relative positions of the radical units 10, which are stacked to form the electrode stack 20, may be fixed by the fixing tape 50. That is, the stacked, aligned state of the radical units 10 can be maintained by the fixing force of the fixing tape 50. For reference, the state of the stack before attaching the fixing tape 30 may be called the electrode stack 20, and the state of the stack after attaching the fixing tape 50 may be called the electrode assembly 1.

Further, in the electrode assembly 1 manufactured in accordance with some embodiments of the present invention, the adhesive 14 may be disposed at the same positions across both electrodes 11 and 12. As an example, in the electrode assembly 1 shown in FIG. 4, the dots of adhesive 14 located along the planar interface defined between the lower portion of the first electrode 11 and the separator 13 may be located at the same two dimensional coordinates along the plane of that interface as the dots of adhesive 14 located along the parallel planar interface defined between the upper portion of the first electrode 11 and the separator 13. Moreover, the intervals defined between the dots of adhesive 14 may be equal to each other. The same situation can also apply in the case of the adhesive 14 located between the second electrode 12 and the separator 13.

Consequently, in the electrode assembly 1 manufactured in accordance with the embodiment of FIG. 4, the adhesive 14 is disposed at the same positions between each of the electrodes 11 and 12 and the respective separator 13. That may result in the advantage of increasing process time and efficiency.

In the electrode assembly 2 manufactured in accordance with the embodiment illustrated in FIG. 5, the locations of the dots of adhesive 14 may be staggered in each successive planar interface between the electrodes and separators. As an example, in the electrode assembly 2 of the embodiment of FIG. 5, the dots of first adhesive 14-1 located between the lower portion of the first electrode 11 and the separator 13 may have alternating positions with respect to the dots of second adhesive 14-2 located between the upper portion of the first electrode 11 and the separator 13. Moreover, although their positions are staggered, the dots of the first adhesive 14-1 may be spaced apart at the same intervals as the dots of the second adhesive 14-2. The same situation can also apply in the case of the adhesive 14 located between the second electrode 12 and the separator 13.

Thus, as an example, in the above-mentioned radical unit manufacturing step, the position(s) of at least one of the first nozzle 211, the second nozzle 212, and the third nozzle 213 may be adjusted, and/or the timing with which the nozzles apply the dots of the first adhesive 14-1 and the second adhesive 14-2, may be adjusted so that the dots of adhesive are staggered across successive layers of the radical unit 10.

As another example, at least one of the first nozzle 211, the second nozzle 212, and the third nozzle 213 may have an adjacent separate nozzle utilized and positioned such that the resulting dots of the first adhesive 14-1 and the second adhesive 14-2 may be staggered across successive layers of the radical unit 10. More specifically, the separate nozzle may be disposed at a position different from the adjacent first nozzle 211, second nozzle 212, or third nozzle 213, so that one of the first adhesive 14-1 and the second adhesive 14-2 is applied from the first nozzle 211, the second nozzle 212, and the third nozzle 213, and the other one of the first adhesive 14-1 and the second adhesive 14-2 is applied from the separate nozzle.

However, the present invention is not limited thereto, and a structure in which the first adhesive 14-1 and the second adhesive 14-2 are staggered with one another may be produced by various acceptable methods.

Beneficially, the above-discussed staggering of the locations of the adhesive dots in each successive layer may result in minimizing the increase in the thickness of the electrode assembly 2 due to the presence of the adhesive 14. In addition to this, such staggering may result in the adhesive 14 being more easily dissolved in the electrolyte solution.

In a method for manufacturing the secondary battery according to other embodiments of the present invention, the radical unit manufacturing step and the electrode assembly manufacturing step will be mainly described below.

FIGS. 6 to 9 are schematic views illustrating a radical unit manufacturing step of a method for manufacturing the secondary battery according to other embodiments of the present invention.

First, in accordance with some embodiments of the present invention, the radical unit 30 may be a unit in which the separator 322 is folded to cover the electrode 31, and the electrode 31 and the separator 322 are stacked. That is, the radical unit 30 may be configured such that one side and the other side of the separator 322 are sequentially folded to cover the electrode 31, while the electrode 31 and the separator 322 are sequentially stacked. A electrode stack 40 in which the radical unit 10 is repeatedly formed a plurality of times can be manufactured.

Referring to FIGS. 6 to 9, the method for manufacturing the secondary battery according to an embodiment of the present invention includes: a step of unwinding first and second electrode sheets 3111 and 3121 from respective first and second electrode reels 311 and 312 to form a plurality of electrodes 31; a step of unwinding the separator 322 from a separator reel 321; a step of positioning the separator 322 on an upper surface of a support, e.g., table 36; and a step of applying adhesive via a nozzle 37 to at least a portion of the electrodes 31 and/or a surface of the separator 322 positioned on the table 36, where the electrodes 31 include first electrodes 3112 created from the first electrode sheet 3111 and second electrodes 3122 created from the second electrode sheet 3121.

More specifically, in the method for manufacturing the secondary battery according to the embodiment shown in FIG. 6, when the first electrode sheet 3111 is unwound from the first electrode reel 311, a first cutter 331 may cut the first electrode sheet 3111 to form a plurality of first electrodes 3112. The first electrodes 3112 are then moved to a different location by a first conveyor 341 (e.g., a conveyor belt), where they are individually picked up by a first positioning device 351. Such positioning device may be robotically-controlled SMT (surface mount technology) component placement system (i.e., pick-and-place tool), which may be configured to pick up each electrode 3112 via a vacuum fitting, multi-finger gripper, or the like.

Meanwhile, referring to FIG. 6, when the separator 322 is unwound from the separator reel 321, a first side 3221 of the separator 322 may become positioned upwardly on the upper surface of the table 36. Then, the first nozzle 371 may apply an adhesive to at least a portion of the first side 3221 of the separator 3222. Here, the first nozzle 371 may apply the adhesive in the form of a plurality of dots.

Then, the table 36 can move towards the first conveyor 341, and the first positioning device 351 holding the first electrode 3112 can also move towards the table 36. However, the present invention is not limited thereto, as the position of the table 36 may alternatively be fixed. For example, where the table 36 remains stationary, the components of the system that position items along the plane of the table 36 may instead translate with respect to the plane of the table 36 so as to position such items in the desired locations. When the first positioning device 351 is located above the table 36, the first positioning device 351 can place the first electrode 3112 on the first side 3221 of the separator 322 to which the adhesive is applied, as shown in FIG. 6.

However, the present invention is not limited to applying adhesive to the separator 3222, and an alternative embodiment (not shown) may involve the adhesive being previously applied to a portion (e.g., the lower portion) of the first electrode 3112 before the first electrode 3112 is placed on the first side 3221 of the separator 322 by the first positioning device 351.

Further, the method for manufacturing the secondary battery according to some embodiments of the present invention may further include a folding step after the step of applying the adhesive. In the folding step, once the first electrode 3112 is positioned on the separator 322, the separator 322 can be folded to cover the first electrode 3112, after which the second electrode 3122 positioned on the separator 322, and then the separator 322 can be folded to cover the second electrode 3122.

More specifically, referring to FIG. 7, after the first electrode 3112 is positioned on the first side 3221, the table 36 may move towards the second conveyor 342 carrying the second electrodes 3122. Then, a portion of the separator 322 extending from the table 36 back towards the separator reel 321 can be folded, such that the second side 3222 of the separator 322 extends across and covers the first electrode 3112. Here, before the first electrode 3112 is covered with the separator 322, an adhesive may be previously applied to the upper portion of the first electrode 3112 or the second side 3222 of the separator 322 by the first nozzle 371.

Meanwhile, when the second electrode sheet 3121 is unwound from the second electrode reel 312, the second cutter 332 may cut the second electrode sheet 3121 to form a plurality of second electrodes 3122. Thereafter, the second electrodes 3122 are moved to a different location by a second conveyor 352, which may be the same type of component as the first conveyor 341.

Further, as shown in FIGS. 7 and 8, after the separator 322 covers the first electrode 3112, a second nozzle 372 located above the second side 3122 may apply an adhesive to at least a portion of the second side 3222 of the separator 322. Here, the second nozzle 372 may apply an adhesive in the form of a plurality of dots.

Then, referring to FIG. 8, the table 36 can move towards the second conveyor 342, and the second positioning device 352 holding the second electrode 3122 may also move towards the table 36. However, the present invention is not limited thereto, since, as discussed above, the position of the table 36 may alternatively be fixed. When the second positioning device 352 is located above the upper side of the table 36, the second positioning device 352 may place the second electrode 3122 on the second side 3222 of the separator 322 to which the adhesive is applied, as shown in FIG. 8.

However, as discussed above, the present invention is not limited thereto, as an alternative embodiment (not shown) may involve the adhesive being previously applied to a portion (e.g., the lower portion) of the second electrode 3122 before the second electrode 3122 is placed on the second side 3222 of the separator 322 by the second positioning device 352.

Thereafter, referring to FIG. 9, after the second electrode 3122 is seated on the second side 3222, the table 36 may move towards the first conveyor 341 that carries the first electrodes 3112. However, once again, the present invention is not limited thereto, and the position of the table 36 may alternatively be fixed. As the electrode stack moves relative to the separator 322, the separator 322 may become folded again, such that the separator 322 covers the second electrode 3122 with the first side 3221 of the separator 322 facing up again. Here, before the second electrode 3122 is covered with the separator 322, an adhesive may be previously applied to the upper portion of the second electrode 3122 or the second side 3222 of the separator 322 by the second nozzle 372.

Further, as shown in FIG. 9, when the separator 322 covers the second electrode 3122, a first nozzle 371 located above of the first side 3221 may apply an adhesive to at least a portion of the first side 3221 of the separator 322. Here, once again, the first nozzle 371 may apply the adhesive in the form of a plurality of dots.

By repeating the above-mentioned processes, the radical unit can be manufactured by a method for manufacturing the secondary battery according to embodiments of the present invention.

FIG. 10 is a cross-sectional view of an electrode assembly manufactured by repeatedly forming the radical unit manufactured using the radical unit manufacturing step in the method for manufacturing the secondary battery according to another embodiment of the present invention. FIG. 11 is a cross-sectional view of an electrode assembly manufactured by repeatedly forming the radical unit manufactured using the radical unit manufacturing step in the method for manufacturing the secondary battery according to another embodiment of the present invention.

In the method for manufacturing the secondary battery according to the embodiment illustrated in FIG. 10, the electrode assembly manufacturing step may include a step of manufacturing the electrode assembly 3 by attaching a fixing tape 50 about at least a portion of a circumference of an electrode stack 40, as illustrated in FIG. 4. Alternatively, unlike the electrode assembly 1 of FIG. 4, the electrode assembly 3 may omit the fixing tape 50, as shown in FIG. 10. That is, instead of the fixing tape 50, one end of the separator 322 may surround a portion of the outer surface of the electrode stack in the electrode assembly of FIG. 10. Here, the electrode assembly manufacturing step may be performed separately from the above-mentioned radical unit manufacturing step, or the above-mentioned radical unit manufacturing step may be included in the electrode assembly manufacturing step.

As in the radical unit 10 of FIG. 4, the radical unit 30 of the embodiment illustrated in FIG. 10 may be in a state in which the electrodes 3112 and 3122 and the separator 322 are adhered to each other with an adhesive 34. Thereby, the electrodes 3112 and 3122 and the separator 322 can be maintained in alignment by adhesive force of the adhesive 34.

The electrode stacks 40 of the embodiment of the invention illustrated in FIG. are configured such that the separator 322 covers the upper and lower portions and one side surface of the electrodes 3112 and 3122, and thus the separator 322 can help maintain the stacked alignment of the radical units 30 even without a separate fixing tape 50. However, a fixing tape 50 may further be attached to the outside of the electrode stack 40 of this embodiment, which may even more stably maintain the stacked alignment of the radical units 30.

Further, in the electrode assembly 3 illustrated in FIG. 10, the adhesive 34 may be disposed at the same positions across both electrodes 3112 and 3122. As an example, as in the electrode assembly 3 shown in FIG. 10, the dots of adhesive 34 located along the planar interface defined between the lower portion of the first electrode 3112 and the separator 322 may be located at the same two-dimensional coordinates along the plane of that interface as the dots of adhesive 34 located along the parallel planar interface defined between the upper portion of the first electrode 3112 and the separator 322. Moreover, the intervals defined between the dots of adhesive 34 may be equal to each other. The same situation can also apply in the case of the adhesive 34 located between the second electrode 3122 and the separator 322.

Therefore, in the electrode assembly 3 manufactured in accordance with the embodiment of FIG. 10, the adhesive 34 is disposed at the same positions between each of the electrodes 3112 and 3122 and the separator 322. That may result in the advantage of increasing process time and efficiency.

In the electrode assembly 4 manufactured in accordance with the embodiment illustrated in FIG. 11, the locations of the dots of adhesive 34 may be staggered in each successive planar interface between the electrodes and separators. As an example, in the electrode assembly 4 of the embodiment of FIG. 11, the dots of first adhesive 34-1 located between the lower portion of the first electrode 3112 and the separator 322 may have alternating positions with respect to the dots of second adhesive 34-2 located between the upper portion of the first electrode 3112 and the separator 322. Moreover, although their positions are staggered, the dots of the first adhesive 34-1 may be spaced apart at the same intervals as the dots of the second adhesive 34-2. The same situation can also apply in the case of the adhesive 14 located between the second electrode 3122 and the separator 322.

Thus, as an example, in the above-mentioned radical unit manufacturing step, the position(s) of at least one of the first nozzle 371 and the second nozzle 372 may be adjusted, and/or the timing with which the nozzles apply the dots of the first adhesive 34-1 and the second adhesive 34-2, may be adjusted so that the dots of adhesive are staggered across successive layers of the radical unit 30.

As another example, at least one of the first nozzle 371 and the second nozzle 372 may have an adjacent separate nozzle utilized and positioned such that the resulting dots of the first adhesive 34-1 and the second adhesive 34-2 may be staggered across successive layers of the radical unit 30. More specifically, the separate nozzle may be disposed at a position different from the adjacent first nozzle 371 or second nozzle 372, so that one of the first adhesive 34-1 and the second adhesive 34-2 is applied from the first nozzle 371 and the second nozzle 372, and the other one of the first adhesive 34-1 and the second adhesive 34-2 is applied from the separate nozzle.

However, the present invention is not limited thereto, and a structure in which the first adhesive 34-1 and the second adhesive 34-2 are staggered with one another may be produced by various acceptable methods.

Beneficially, the above-discussed staggering of the locations of the adhesive dots in each successive layer may result in minimizing the increase in the thickness of the electrode assembly 4 due to the presence of the adhesive 34. In addition, such staggering may result in the adhesives 34 being more easily dissolved in the electrolyte solution.

The above-described basic units 10 and 30 will be mainly described below.

FIGS. 12 and 13 are exploded perspective views of a radical unit manufactured using the radical unit manufacturing step in the method for manufacturing the secondary battery according to other embodiments of the present invention.

Referring to FIG. 12, the radical unit 10 may have a structure in which the separator 13, the first electrode 11, the separator 13, and the second electrode 12 are alternately stacked, as in FIGS. 2 to 5. Here, the separator 13 located under the first electrode 11 is called a lower separator, and the separator 13 located under the second electrode 12 is called an upper separator.

FIG. 12 may also depict the radical units 30 of FIGS. 6 to 11, in which the separator is folded to follow a zigzag or serpentine path between the electrodes 3112 and 3122 of the radical unit 30. However, for convenience and uniformity of explanation, the folded portion of the separator 322 is omitted from the illustration in FIG. 12.

In the radical units 10 and 30, first electrode tabs 11*t* and 3112*t* may be formed at one end of the first electrodes 11 and 3112, and second electrode tabs 12*t* and 3122*t* may be formed at one end of the second electrodes 12 and 3122. Here, the first electrodes 11 and 3112 and the second electrodes 12 and 3122 may be disposed such that the first electrode tabs 11*t* and 3112*t* and the second electrode tabs 12*t* and 3122*t* extend out from the radical unit 10, 30 along different directions.

Here, adhesive layers 14 and 34 may be formed between the first electrodes 11 and 3112 and the separators 13 and 322 and between the second electrodes 13 and 3122 and the separators 12 and 322. As an example, the adhesive layers 14 and 34 may be formed by applying an adhesive in the form of a plurality of dots, as shown in FIG. 12. Further, the plurality of dots may be arranged at regular intervals. Further, the adhesive layers 14 and 34 may include an adhesive component that becomes dissolved in the electrolyte solution, as discussed later.

Therefore, in the radical units 10 and 30 of the embodiment illustrated in FIG. 12, the adhesive layers 14 and 34 are arranged in the form of a plurality of dots, and can be more easily dissolved in the electrolyte solution. It is noted that, in the final battery cell, the adhesive layers 14 and 34 dissolve and thus do not remain on the surfaces of the first electrodes 11 and 3112 and the second electrodes 12 and 3122, thereby preventing substantial deterioration of cell performance that could occur due to the presence of the adhesive layers 14 and 34.

Referring to FIG. 13, the radical units 10' and 30' can be described almost in the same way as the radical units 10 and 30 of FIG. 12, and the adhesive layers 14 and 34 will be mainly described below.

In the radical units 10' and 30' according to the embodiment illustrated in FIG. 13, the adhesive layers 14 and 34 may include first adhesive layers 1410 and 3410 and second adhesive layers 1420 and 3420. Here, the first adhesive layers 1410 and 3410 may be located between the central region of the first electrodes 11 and 3112 and the separators 13 and 322 and between the central region of the second electrodes 12 and 3122 and the separators 13 and 322.

As an example, as shown in FIG. 13, the second adhesive layers 1420 and 3420 may be located at one or more peripheral regions of the separators 12 and 322, such as at both ends of the separators 12 and 322 adjacent to the first electrode tabs 11*t* and 3112*t* and/or the second electrode tabs 12*t* and 3122*t*. More specifically, the second adhesive layers 1420 and 3420 may be located between the first electrode tabs 11*t* and 3112*t* and the separators 13 and 322 and between the second electrode tabs 12*t* and 3122*t* and the separators 13 and 322.

As a further example (not shown), the second adhesive layers 1420 and 3420 can be formed between the first electrode tabs 11*t* and 3112*t* and the separators 13 and 322 only in the regions where the first electrode tabs 11*t* and 3112*t* and the separators 13 and 322 face each other, and the second adhesive layers 1420 and 3420 can likewise be formed between the second electrode tabs 12*t* and 3122*t* and the separators 13 and 322 only in the regions where the second electrode tabs 12*t* and 3122*t* and the separators 13 and 322 face each other.

In the above examples, the first adhesive layers 1410 and 3410 and the second adhesive layers 1420 and 3420 may each be formed by applying a respective adhesive in the form of a plurality of dots.

In accordance with some embodiments of the invention, the first adhesive layers 1410 and 3410 may include an adhesive component that becomes dissolved in the electrolyte solution contained in the initial cell 0, similar to the adhesive layers 14 and 34 of FIG. 12. Meanwhile, the second adhesive layers 1420 and 3420 may include an adhesive component that does not become dissolved in the electrolyte solution.

Thus, in the above-mentioned radical unit manufacturing step, the type of adhesive applied from at least one of the nozzles 210 of FIGS. 2 and 3 or at least one of the nozzles 37 of FIGS. 6 to 9 may be varied during the manufacturing process. As a result, different first adhesive layers 1410 and 3410 and second adhesive layers 1420 and 3420 may be formed.

As an alternative example, in the above-mentioned radical unit manufacturing step, at least one separate nozzle may be provided beyond the nozzles 210 of FIGS. 2 and 3 or the nozzles 37 of FIGS. 6 to 9. That way, one or more nozzles may be provided that are dedicated to providing one of the first adhesive layers 1410 and 3410 and the second adhesive layers 1420 and 3420. More specifically, the separate nozzles may be disposed adjacent to both ends of the separators 13 and 322, so that the first adhesive layers 1410 and 3410 are formed from the nozzles 21 of FIGS. 2 and 3 or the nozzles 37 of FIGS. 6 to 9, and second adhesive layers 1420 and 3420 may be formed from the separate nozzle(s).

However, the present invention is not limited thereto, and the first adhesive layers 1410 and 3410 and the second adhesive layers 1420 and 3420 may be formed by applying different adhesives by various methods.

In the radical units 10' and 30' in accordance with embodiments of the present invention, the first adhesive layers 1410 and 3410 may be located between the central portions of the first electrodes 11 and 3112 and the separators 13 and 322 and between the central portions of the second electrodes 12 and 3122 and the separators 13 and 322, so that the first adhesive layers 15 and 35 dissolve and do not remain on the surfaces of the first electrodes 11 and 3112 and the second electrodes 12 and 3122 in the final battery cell, thereby substantially preventing deterioration of cell performance due to the presence of the first adhesive layers 1410 and 3410 between the electrodes and adjacent separators.

In addition to this, in the radical units 10' and 30' of some embodiments of the present invention, the second adhesive layers 1420 and 3420 are located between the first electrode tabs 11*t* and 3112*t* and the separators 13 and 322 and between the second electrode tab 12*t* and 3122*t*. Thus, in the final battery cell, the second adhesive layers 1420 and 3420 are not dissolved in the electrolyte solution, thereby preventing the separators 13 and 322 facing the first electrode tabs 11*t* and 3112*t* and the second electrode tabs 12*t* and 3122*t* from being folded. Further, the second adhesive layers 1420 and 3420 can prevent the first electrodes 11 and 3112 and the second electrodes 12 and 3122 from becoming separated from the separators 13 and 322 in the final battery cell.

In other embodiments, the second adhesive layers 1420 and 3420 may be located between the pair of separators 13 and 322 facing each other, and the second adhesive layers may be formed in a portion except the portion where the separators 13 and 322 and the first electrodes 11 and 3112 and/or the second electrodes 12 and 3122 come into contact. In other words, the second adhesive layers 1420 and 3420 may be positioned between a pair of separators 13 and 322 facing each other, and the second adhesive layers can be formed in a portion excluding a portion where the separators 13 and 322 and the first electrodes 11 and 3112 and/or the second electrodes 12 and 3122 are in contact with each other. In other words, the second adhesive layers 1420 and 3420 are located between the pair of separators 13 and 322 facing each other, but do not come into contact with the first electrodes 11 and 3112 and the second electrodes 12 and 3122.

Therefore, in the radical units 10' and 30' of some embodiments of the present invention, the second adhesive layers 1420 and 3420 are formed at positions avoiding a portion where the first electrodes 11 and 3112 and/or the second electrodes 12 and 3122 come into contact with the separators 13 and 322, so that the second adhesive layers 1420 and 3420 can prevent the first electrodes 11 and 3112 and the second electrodes 12 and 3122 from interfering with the movement of lithium ions between the separators 13 and 322. That is, the second adhesive layers 1420 and 3420 can prevent the above-mentioned separators 13 and 322 from being folded without degrading cell performance, and can prevent the first electrodes 11 and 3112 and the second electrodes 12 and 3122 from being separated from the separators 13 and 322.

FIG. 14 is a perspective view illustrating an initial cell manufacturing step in the method for manufacturing the secondary battery according to another embodiment of the present invention. FIG. 15 is a front view illustrating a formation process in a method for manufacturing a secondary battery according to an embodiment of the present invention.

The method for manufacturing the secondary battery according to the embodiment illustrated in FIG. 14 may include an initial cell manufacturing step after the electrode assembly manufacturing step.

The initial cell manufacturing step may include: accommodating the electrode assemblies 1, 2, 3, and 4 in a pouch case 70, injecting an electrolyte solution into the pouch case 70, and sealing the pouch case edge 71, thereby manufacturing an initial cell 0. The pouch case 70 may include a gas pocket part 75 extending to one side of the cup part in which the electrode assemblies 1, 2, 3, and 4 are accommodated. After the electrode assemblies 1, 2, 3 and 4 and the electrolyte solution are accommodated in the cup part, the pouch case edge 71 can be sealed.

In this case, the sealing may be performed along an edge of the cup part and an outer edge of the gas pocket part 75 so that a perimeter of the area on which the cup part and the gas pocket part 75 are formed may be sealed. Such sealing may be in the form of a closed curve so that the combined area of the cup part and the gas pocket part 75 is sealed from the outside, but the cup part and gas pocket part may continue to communicate with each other.

When the initial cell 0 is manufactured and sealed from the outside, the step of post-processing the initial cell 0 to form the final cell may be performed. In the final cell manufacturing step, the adhesive applied to the surface of at least one of the electrode and the separators 13 and 322 in the foregoing radical unit manufacturing step may be dissolved. The electrolyte solution contained in the initial cell 0 may be an organic solvent, such that the adhesives 14 and 34 become dissolved and dispersed into the electrolyte solution.

Thus, due to such dissolving, the adhesives 14 and 34 applied to the surface of the electrode or separators 13 and 322 may be reduced in area, or the applied adhesives 14 and 34 may be completely removed so as to no longer remain on the surface of the electrode. In the case of the electrodes 11, 12, and 31, it may mean that the adhesives 14 and 34 do not remain on the electrode surface.

Further, in the case of the separators 13 and 322, a portion of the adhesives 14 and 34 may be permeated into the separators 13 and 322 in that the separators 13 and 322 are generally a porous sheet. In the final cell manufacturing step described above, the adhesives 14 and 34 that have penetrated into the separators 13 and 322 may be dissolved into the electrolyte solution, and, as a result, one or more marks where the adhesives 14 and 34 were applied may remain on the separators 13 and 322.

The above-discussed marks left by the adhesives 14 and 34 (hereinafter "application marks") may mean that the components of the adhesives 14 and 34 do not remain, but a portion of the outer surfaces of the separators 13 and 322 are deformed by the adhesives 14 and 34. However, the present invention is not limited thereto, and the application marks of the adhesives 14 and 34 may mean one or more marks that can confirm whether the adhesives 14 and 34 had been applied by various methods, such as a mark visible with the naked eye that can confirm whether the adhesives 14 and 34 had been applied.

Therefore, the application mark of the adhesives 14 and 34 formed on the separators 13 and 322 may be formed at the same position as the position where the adhesives 14 and 34 had been applied.

The adhesives 14 and 34 for allowing the electrode and the separator to adhere to each other may, in some embodiments, be an acrylate-based adhesive. By using acrylate-based adhesives 14 and 34, it may be possible to dissolve the adhesives 14 and 34 into the electrolyte solution. Some preferred examples of suitable acrylate-based adhesives may be any of those disclosed in Korean Patent Application No. 2021-0076220, filed on Jun. 11, 2021, or Korean Patent Application No. 2021-0076219, filed on Jun. 11, 2021, the entire disclosures of both of which are incorporated herein by reference.

In the method for manufacturing the secondary battery according to some embodiments of the present invention, the final cell manufacturing step may include a formation process of charging the initial cell 0 at a high temperature that is greater than room temperature to activate the initial cell 0. The formation process (activation process) may be a process in which an SEI layer is formed on a surface of electrode plates of the electrode assembly via the charging process.

In the final cell manufacturing step, the formation process may be performed at a temperature of 45 degrees or more. In addition, at least a portion of the adhesives 14 and 34 may be dissolved in the formation process. Also, more preferably, in the final cell manufacturing step, the formation process may be performed at a temperature between 50 degrees and 70 degrees. The dissolution of the adhesive 14 is more likely to occur at a temperature of at least 50 degrees, which is higher than 45 degrees. Also, temperatures of 70 degrees or more may be undesirable because the performance of the cell product may be deteriorated.

In the final cell manufacturing step of the method for manufacturing the secondary battery according to the embodiment of FIG. 15, the formation process may include a jig pressing process of pressing both side surfaces of an initial cell 0 by using a jig 500. Here, a left side of the initial cell 0 may be pressed using a left jig 510, and a right side of the initial cell 0 may be pressed using the right jig 520. When the initial cell 0 is pressed using the jig, any gas generated inside the electrode assemblies 1, 2, 3 and 4 may smoothly move to the gas pocket part 75. The gas, having moved to the gas pocket part 75, may then be easily discharged outside of the cell in a subsequent degassing process. If the jig pressing process is performed during the formation process, the process of dissolving the adhesive 14 in the electrolyte solution may be easily performed.

The jig pressing process may include a process of applying and releasing pressure applied by the jig 500 on both side surfaces of the initial cell 0. That is, a cycle, in which the jig 500 applies and releases pressure to/from the initial cell 0, may be repeated at least twice.

Each cycle of applying pressure by the jig 500 may result in directly applying physical force to the adhesives 14 and 34 by alternately applying positive and negative pressures during dissolution of the adhesives. Thus, such cycling of the pressure application by the jig 500 may cause the adhesives 14 and 34 to better dissolve.

A control device may be connected to a jig device for more systematic operation. As a result, a positive pressure time and a negative pressure time may be adjusted, and an intensity of the positive pressure and an intensity of the negative pressure may also be controlled. Therefore, a more effective adhesive dissolution system can be implemented.

In the final cell manufacturing step of the method for manufacturing the secondary battery according to some embodiments of the present invention, the formation process may include a jig pressing process which is performed at a temperature of 55 degrees to 65 degrees. In such a case, preferably the adhesive 14 is completely dissolved in the formation process. As a result, marks from the adhesives 14 and 34 may not remain on the surface(s) of the electrode(s), although, as described above, the application mark(s) from the adhesives 14 and 34 may remain on the separators 13 and 322.

When some of the adhesives 14 and 34 remain on the surface of the electrode, such area occupied by the adhesives 14 and 34 may become a non-reaction area on which an electrode reaction does not occur, which may thus deteriorate performance of the battery. However, as in the present invention, when the adhesives 14 and 34 are completely dissolved and disappear from the surfaces of the electrode(s) or separators 13 and 322, the non-reaction area due to the adhesives 14 and 34 may be reduced or eliminated so as to prevent the battery performance from being deteriorated.

The final cell manufacturing step in the method for manufacturing the secondary battery according to some embodiments of the present invention may further include a pre-aging process involving storing the initial cell 0 at room temperature before the formation process. The pre-aging process at room temperature may be performed for about 1.5 days. The pre-aging process may be a process that allows the electrolyte to be sufficiently impregnated between the electrode and the separators 13 and 322. Of course, some portion of the adhesives 14 and 34 may be dissolved even in the pre-aging process.

In addition, the final cell manufacturing step may further include a room-temperature aging process involving storing the initial cell 0 at room temperature after the formation process. The room-temperature aging process may be performed for about 1 day. In addition, the final cell manufacturing step may further include a high-temperature aging process of storing the initial cell 0 at a temperature of 60 degrees to 65 degrees after the room temperature aging process and before the degassing process.

In addition, the final cell manufacturing step may include the degassing process after the high-temperature aging process. The degassing process may be a process involving discharging the internal gas from the initial cell 0 to the outside. The gas discharged in the degassing process may be the internal gas that was mainly generated in the formation process and stored in the gas pocket part 75. In the degassing process, a through-hole may be formed in the gas pocket part 75 to allow the gas to be discharged to the outside.

The final cell manufacturing step may include a re-sealing process involving re-sealing the initial cell 0 so as to be sealed from the outside again after the degassing process. As a result, the final cell manufacturing step may result in the final cell. In such state, the adhesives 14 and 34 may be dissolved so as not to remain on the surface of the internal electrode or the separators 13 and 322 of the manufactured final cell. In particular, as described above, however, the application marks of the adhesives 14 and 34 may remain on the separators 13 and 322.

The method for manufacturing the secondary battery according to some embodiments of the present invention may further include a finish charging/discharging step of charging and discharging the final cell after the final cell manufacturing step. The final charge/discharge step may include a process of measuring a battery capacity of the final cell and may include a process of finally charging the battery to a set voltage for shipment of the final product.

Hereinafter, the contents of the present invention will be described with reference to more specific experimental examples, but the following experimental examples are for illustrative purposes only, and the scope of the present invention is not limited thereto.

Experimental Example—Confirmation of Application Mark of Adhesive

A battery cell was manufactured accommodating an electrode assembly, in which a positive electrode, a negative electrode, and a separator were alternately stacked, together with an electrolyte solution. The adhesive was applied in the form of a plurality of dots between the positive electrode and the separator and between the negative electrode and the separator. The separator was a CCS (Ceramic Coated Separator), the adhesive included an acrylate-based adhesive material, and the electrolyte solution was a standard electrolyte solution in which ethylene carbonate (EC) and ethylmethyl carbonate (EMC) are mixed in a ratio of 3:7.

Then, the manufactured battery cell was charged, the separator was separated from the charged battery cell, the separated separator was washed with acetone and dried to remove the electrolyte solution absorbed in the separated separator, and then the surface of the separator was observed. The results are shown in FIG. 16. FIG. 16 (*a*) is an image confirmed with the naked eye, and FIG. 16 (*b*) is an image taken by magnifying it with a microscope.

Analysis of Experimental Results—Confirmation of Application Mark of Adhesive Referring to FIGS. 16 (*a*) and (*b*), in the separator separated from the charged battery cell, it can be confirmed that the adhesive leaves a mark on the separator. In particular, when magnified and photographed with a microscope as shown in the enlargement of FIG. 16(*b*), it can be more easily observed and confirmed that an application mark of the adhesive was left on the separator.

That is, in the battery cell fabricated according to the present embodiment, it can be confirmed that the adhesive was applied between the positive electrode and the separator and between the negative electrode and the separator in the electrode assembly unit, based on the application mark of the adhesive left on the outer surface of the separator.

While the embodiments of the present invention have been described with reference to the specific embodiments and the accompanying drawings, it will be apparent to those skilled in the art that various changes and modifications may be made without departing from the spirit and scope of the invention as defined in the following claims.

DESCRIPTION OF THE SYMBOLS

0: Initial cell
1,2,3,4: Electrode assembly
2: Pouch case
3: Pouch case edge
4: Gas pocket part
10, 30: Radical unit
11, 3112: First electrode
11-1, 311: First electrode reel
12, 3122: Second electrode
12-1, 312: Second electrode reel
13, 322: Separator
14, 34: Adhesive
20, 40: Electrode stack
50: Fixing tape
60: Electrode lead
110: Lower separator reel
111: Lower separator sheet
120: Upper separator reel
121: Upper separator sheet
130: Four-layered stack
210, 371: Nozzle
211, 371: First nozzle
212, 372: Second nozzle
213: Third nozzle
221, 331: First cutter
222, 332: Second cutter
223: Third cutter
230: Pressing nip roll
300: Jig
310: Left jig
320: Right jig

The invention claimed is:

1. A secondary battery comprising:

an electrode assembly in which a plurality of electrodes and at least one separator are alternately stacked in a stack, such that at least one interface is defined between a surface of the at least one separator and a first one of the plurality of electrodes;

a battery case accommodating the electrode assembly and an electrolyte solution therein, and an adhesive application mark on the surface of the at least one separator along the at least one interface, wherein the adhesive application mark includes a deformation of the surface of the at least one separator, and wherein the adhesive is dissolvable by the electrolyte solution.

2. The secondary battery of claim 1, wherein the adhesive application mark includes a plurality of dots spaced apart on the surface of the at least one separator along the at least one interface.

3. The secondary battery of claim 2, wherein:

the adhesive is an acrylate-based adhesive, and the electrolyte solution is an organic solvent.

4. The secondary battery of claim 1, wherein:

the plurality of electrodes include a first electrode and a second electrode, the at least one separator includes an upper separator and a lower separator, and the plurality of electrodes and the at least one separator are alternately stacked in the following order: the lower separator, the first electrode, the upper separator, and the second electrode.

5. The secondary battery of claim 1, wherein:

the plurality of electrodes in the stack include a first electrode and a second electrode, and the at least one separator is elongated and folded to follow a serpentine path through the stack, such that: a first portion of the at least one separator extends across a first side of the first electrode, a second portion of the at least one separator extends across a second side of the first electrode and across a first side of the second electrode, and a third portion of the at least one separator extends across a second side of the second electrode.

6. The secondary battery of claim 4, wherein:

an electrode tab is positioned at an end of the first electrode, an adhesive layer is disposed between the electrode tab and the at least one separator, and the adhesive layer comprises a second adhesive that is insoluble in the electrolyte solution.

7. The secondary battery of claim 6, wherein:

the adhesive layer includes a plurality of spaced-apart dots of the second adhesive.

8. The secondary battery of claim 1, wherein the adhesive application mark does not include any components of the adhesive.

9. The secondary battery of claim 1, wherein the adhesive is completely dissolved into the electrolyte solution such that none of the adhesive remains on a surface of the first electrode.

10. The secondary battery of claim 1, wherein the deformation of the surface of the at least one separator is without a corresponding visible mark present on the electrode.

11. A secondary battery comprising:

an electrode assembly in which a plurality of electrodes and a plurality of separators are alternately stacked in a stack, such that at least one interface is defined between a surface of a separator of the plurality of separators and a first one of the plurality of electrodes;

a battery case accommodating the electrode assembly and an electrolyte solution therein, and an adhesive application mark on the surface of the separator of the plurality of separators along the at least one interface, wherein the adhesive is dissolvable by the electrolyte solution, wherein an electrode tab is positioned at an end of an electrode of the plurality of electrodes and between two separators of the plurality of separators, an adhesive layer is disposed between the electrode tab and one of the two separators, and the adhesive layer comprises a second adhesive that is insoluble in the electrolyte solution, and wherein the adhesive application mark includes a deformation of the surface of the separator of the plurality of separators that has been deformed by the adhesive.

12. The secondary battery of claim 11, wherein:

the adhesive layer includes a plurality of spaced-apart dots of the second adhesive.

13. The secondary battery of claim 11, wherein the adhesive application mark includes a plurality of dots spaced apart on the surface of the separator of the plurality of separators along the at least one interface.

14. The secondary battery of claim 13, wherein:

the adhesive is an acrylate-based adhesive, and the electrolyte solution is an organic solvent.

15. The secondary battery of claim 11, wherein:

the plurality of electrodes includes a first electrode and a second electrode, the plurality of separators includes an upper separator and a lower separator, and the plurality of electrodes and the plurality of separators are alternately stacked in the following order: the lower separator, the first electrode, the upper separator, and the second electrode.

16. The secondary battery of claim 11, wherein the adhesive application mark does not include any components of the adhesive.

17. The secondary battery of claim 11, wherein the adhesive is completely dissolved into the electrolyte solution such that none of the adhesive remains on a surface of the first electrode.

18. The secondary battery of claim 11, wherein the deformation of the surface of the separator of the plurality of separators is without a corresponding visible mark present on the electrode.

* * * * *